United States Patent
Oshitani et al.

(10) Patent No.: US 8,542,310 B2
(45) Date of Patent: Sep. 24, 2013

(54) IMAGING LENS, MANUFACTURING METHOD AND IMAGING UNIT THEREFOR

(75) Inventors: Hiroshi Oshitani, Amagasaki (JP); Yasunari Fukuta, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 360 days.

(21) Appl. No.: 13/001,198

(22) PCT Filed: Jul. 2, 2009

(86) PCT No.: PCT/JP2009/062111
§ 371 (c)(1),
(2), (4) Date: Dec. 23, 2010

(87) PCT Pub. No.: WO2010/001955
PCT Pub. Date: Jan. 7, 2010

(65) Prior Publication Data
US 2011/0102661 A1    May 5, 2011

(30) Foreign Application Priority Data
Jul. 4, 2008  (JP) ................................. 2008-175686

(51) Int. Cl.
*H04N 5/225* (2006.01)
(52) U.S. Cl.
USPC ............................. 348/340; 348/360; 359/503
(58) Field of Classification Search
USPC ................. 348/335, 340, 360, 361; 359/503; 156/99
See application file for complete search history.

(56) References Cited

U.S. PATENT DOCUMENTS

| | | | |
|---|---|---|---|
| 8,049,806 B2 * | 11/2011 | Feldman et al. | 348/340 |
| 2007/0242370 A1 | 10/2007 | Fukuta et al. | |
| 2009/0225215 A1 * | 9/2009 | Korenaga et al. | 348/340 |
| 2012/0206639 A1 * | 8/2012 | Matsui et al. | 348/340 |

FOREIGN PATENT DOCUMENTS

| | | |
|---|---|---|
| CN | 2884235 | 3/2007 |
| CN | 101055345 | 10/2007 |
| JP | 63-082401 | 4/1988 |
| JP | 1-177007 | 7/1989 |
| JP | 11-211902 | 8/1999 |
| JP | 2002-90621 | 3/2002 |
| JP | 2003-4906 | 1/2003 |
| JP | 2003-329808 | 11/2003 |
| JP | 2005-195733 | 7/2005 |
| JP | 2006-64758 | 3/2006 |
| JP | 3929479 | 6/2007 |
| JP | 2007-524243 | 8/2007 |
| JP | 2007-233320 | 9/2007 |
| JP | 2007-286153 | 11/2007 |
| JP | 2008-508545 | 3/2008 |
| WO | WO 2005/083789 | 9/2005 |
| WO | WO 2006/010622 | 2/2006 |

* cited by examiner

*Primary Examiner* — Tuan Ho
(74) *Attorney, Agent, or Firm* — Cozen O'Connor

(57) ABSTRACT

Provided is an imaging lens, in which a space holding portion is formed outside the effective aperture of one or both of junction type compound lenses facing each other in order to hold the space between the junction type compound lenses. A mating face formed on the space holding portion which is made of the same material as that of a lens portion is brought in direct contact with a mating face provided on the other among the junction type compound lenses facing each other at the position facing the mating face of the space holding portion, outside the effective aperture of the other junction type compound lens. Alternatively, mating faces which are formed on confronting surfaces of the space holding portions formed on the facing junction type compound lenses are brought in direct contact with each other.

32 Claims, 16 Drawing Sheets

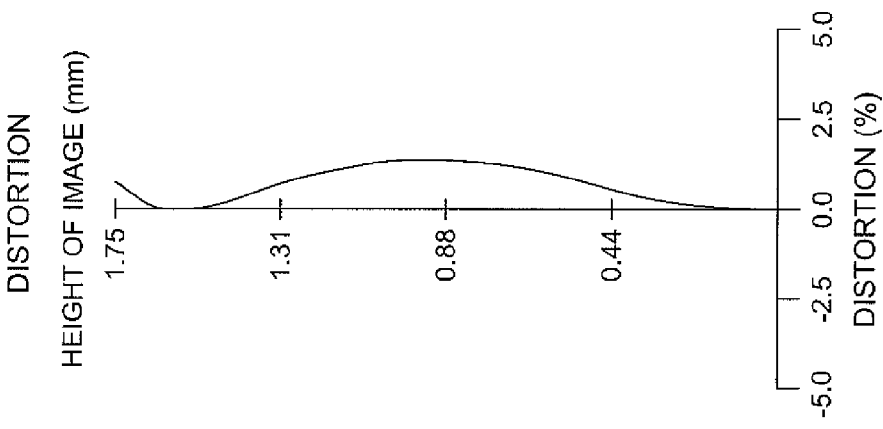
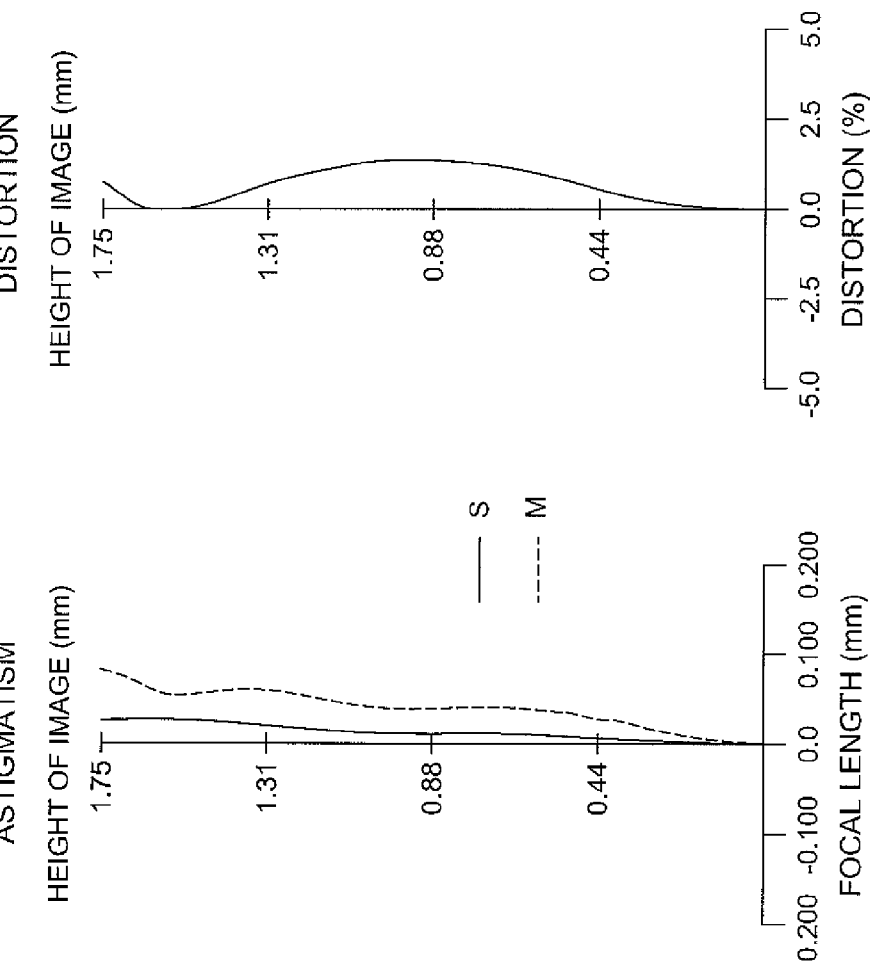
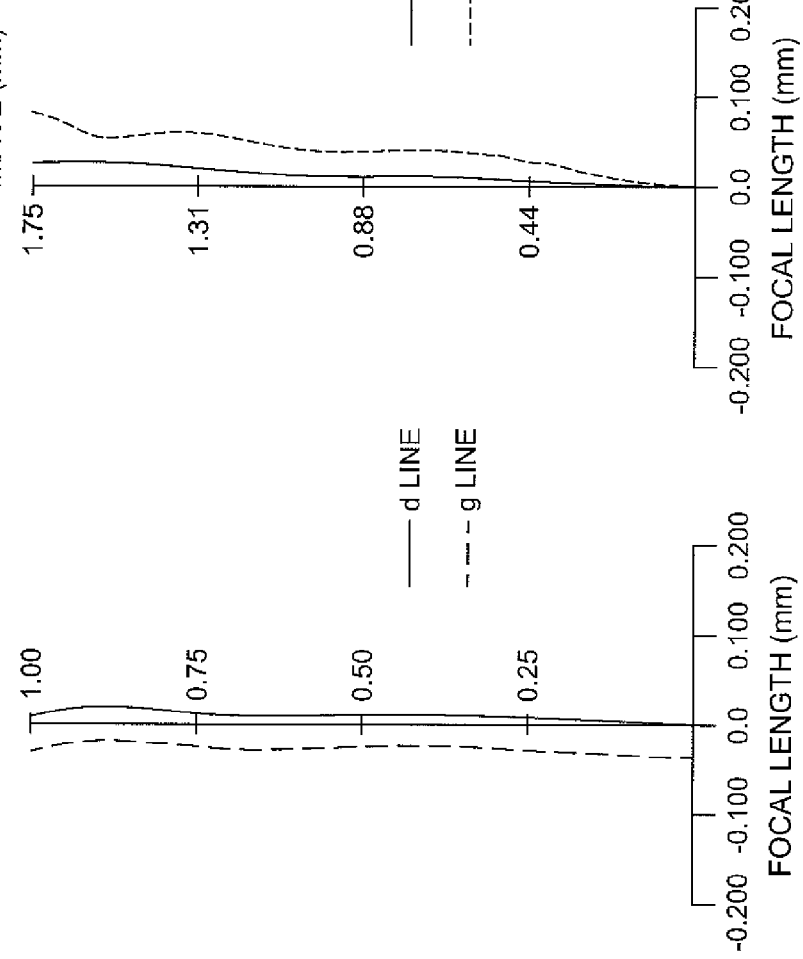

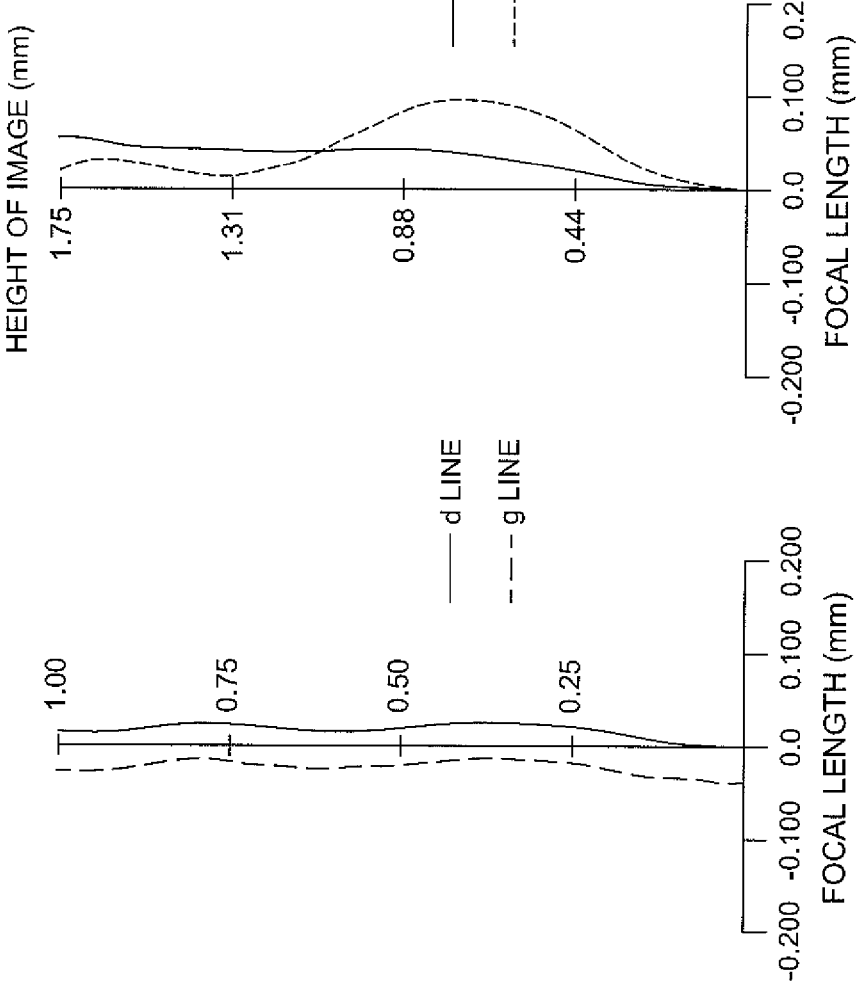
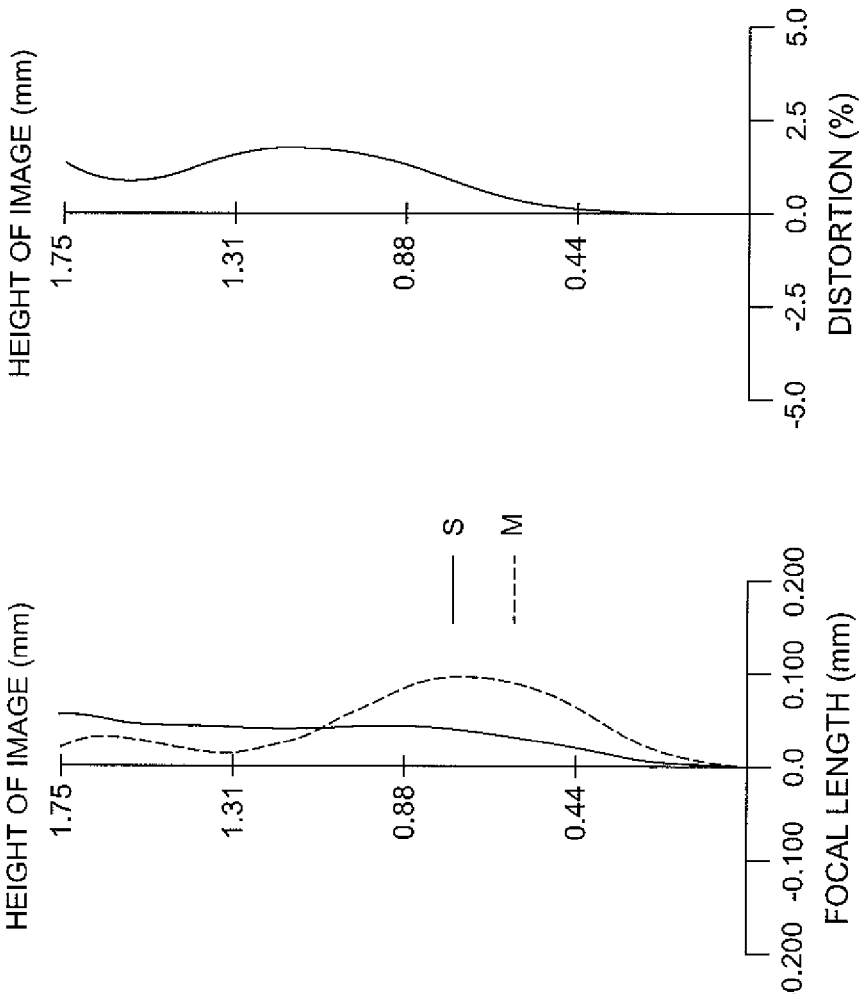
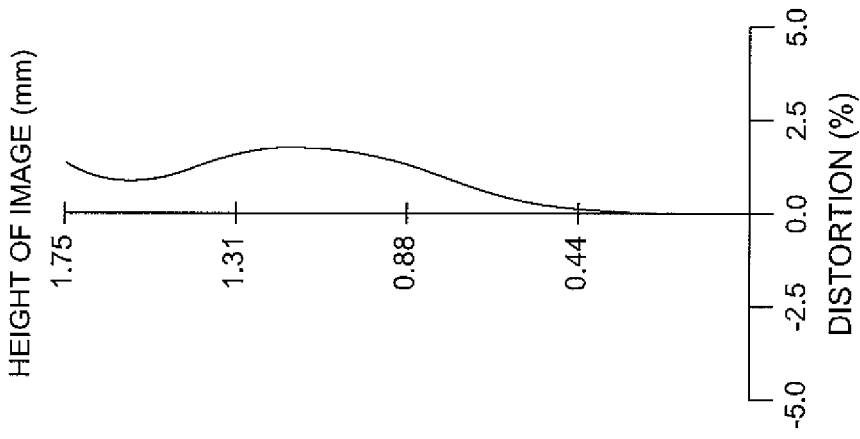

DISTORTION

ASTIGMATISM

SPHERICAL ABERRATION

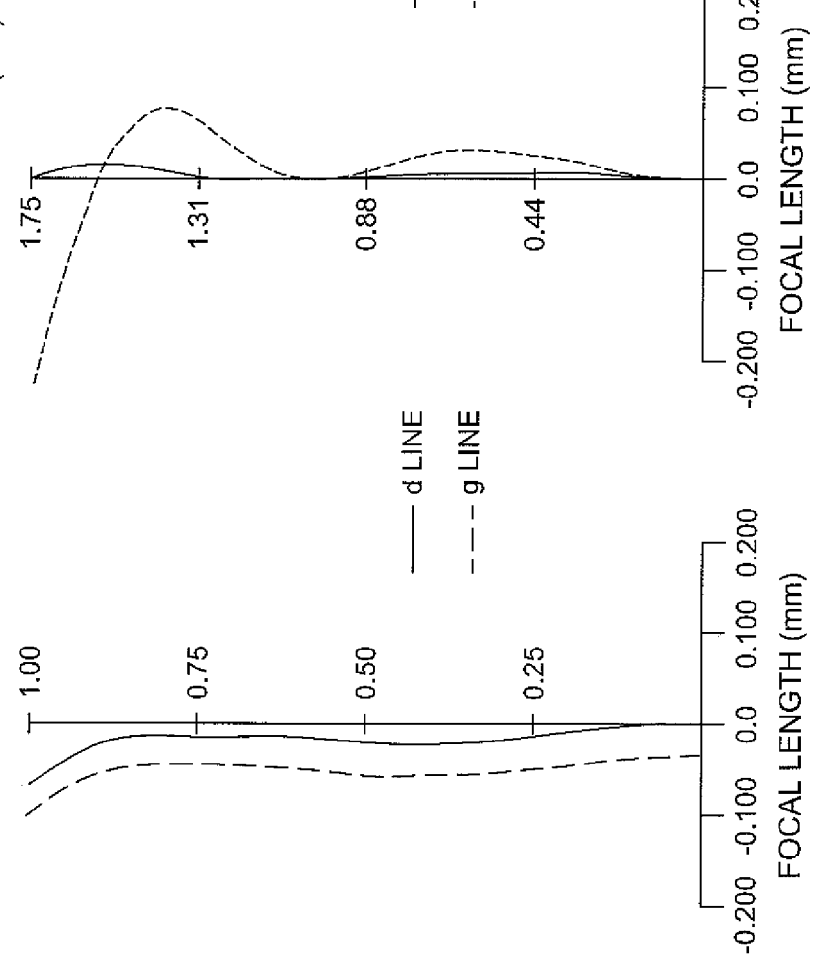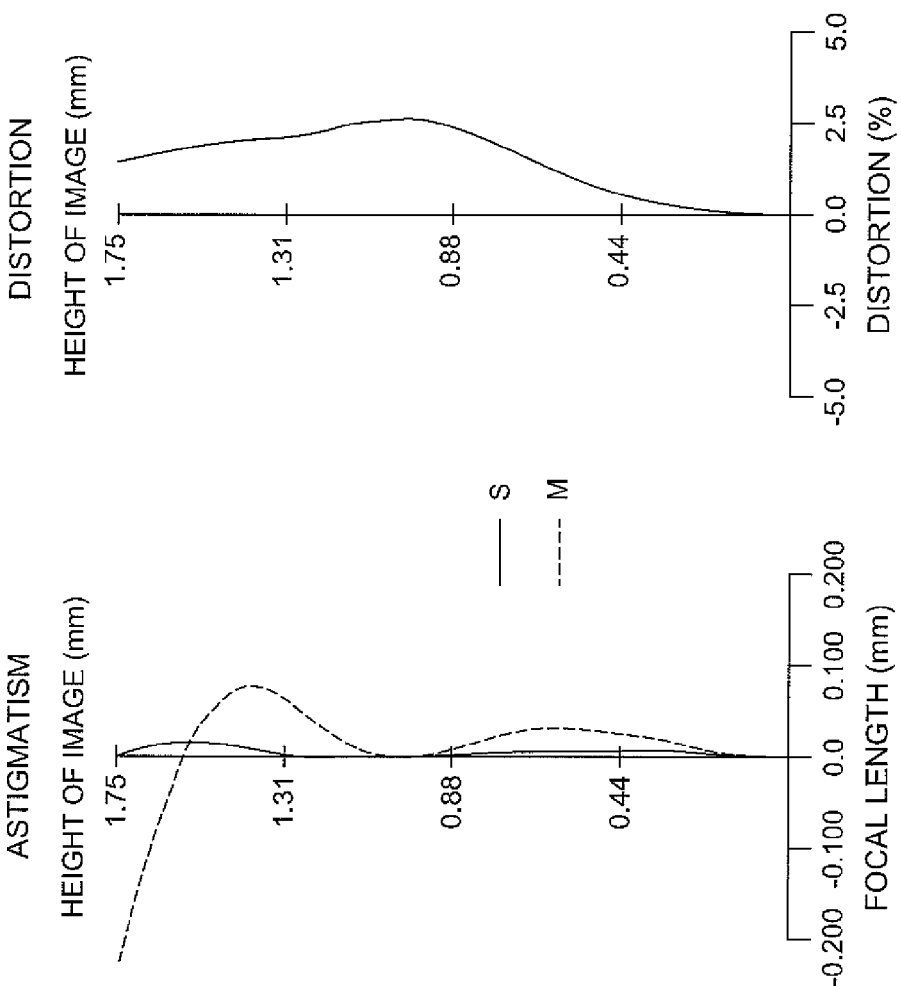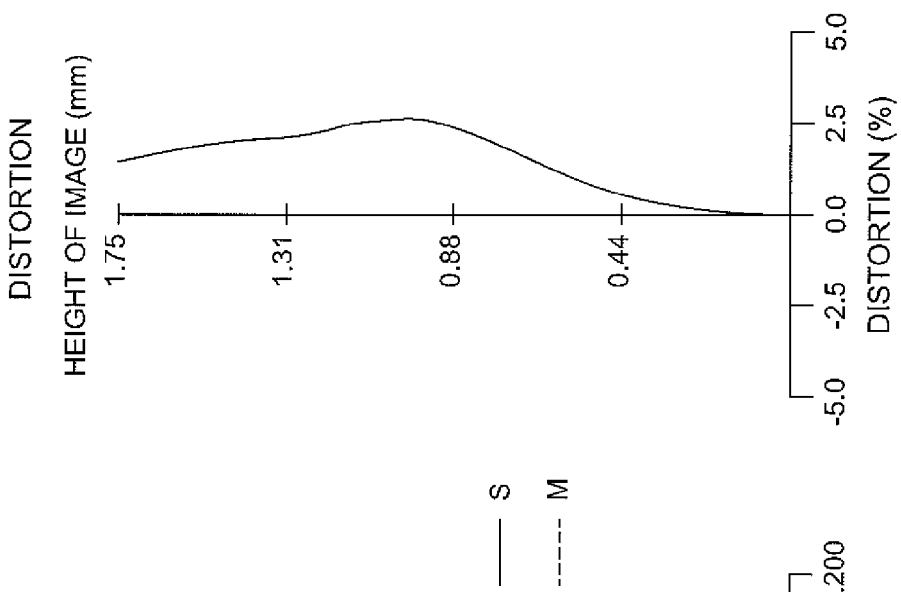

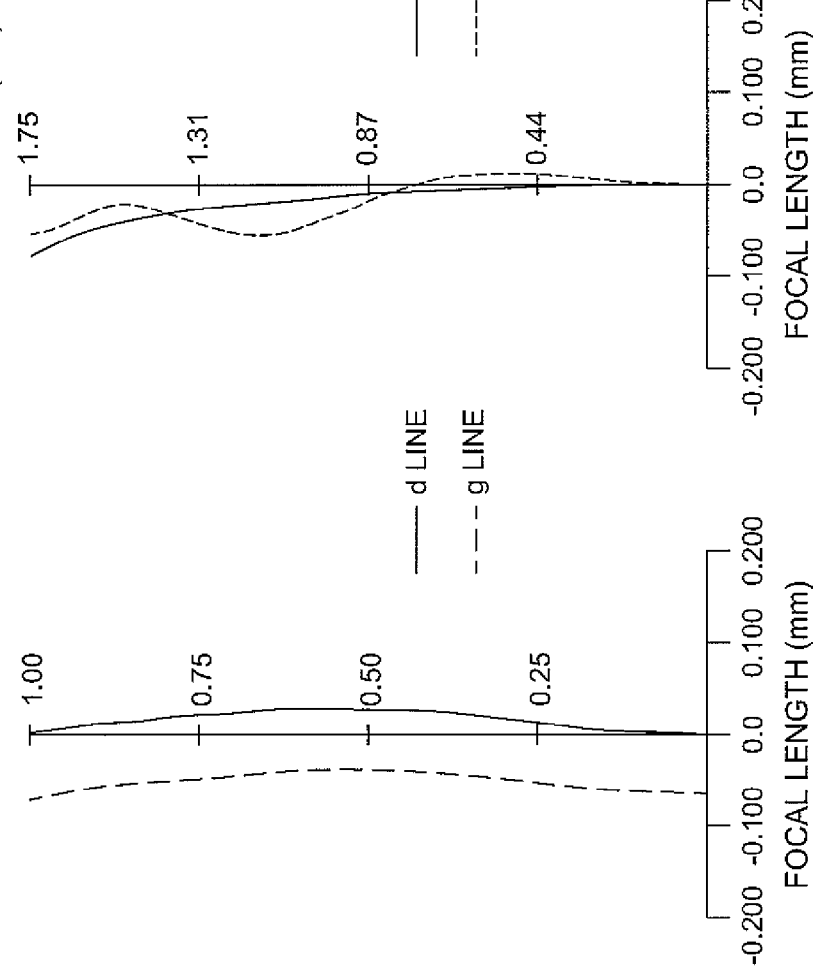
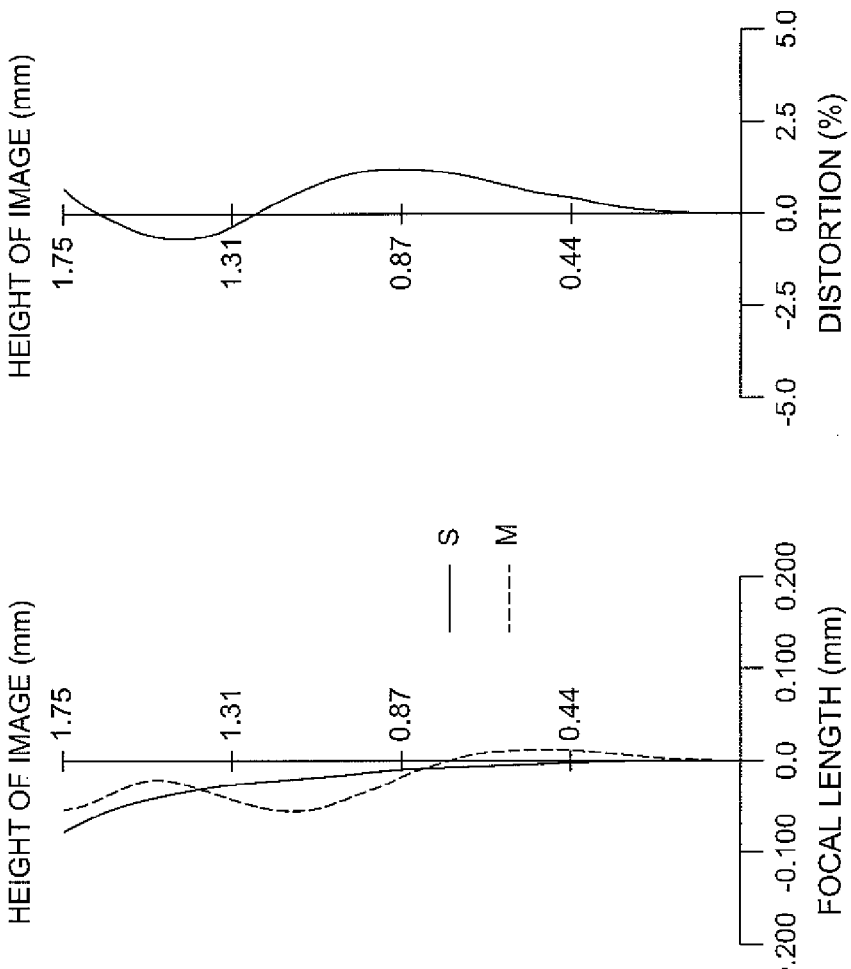
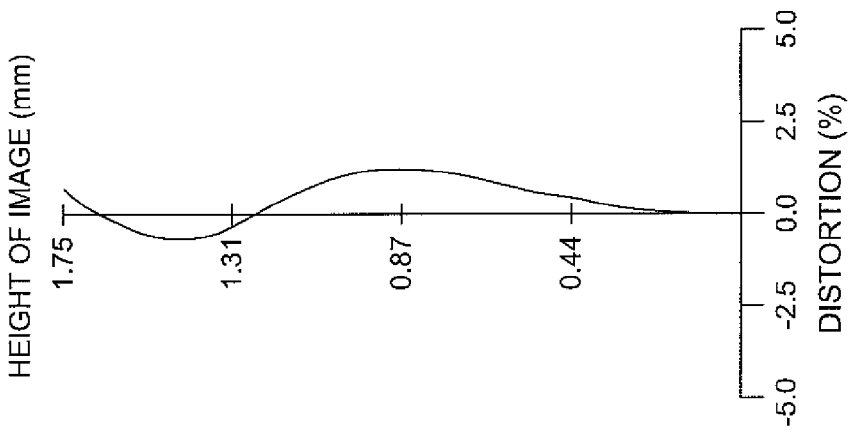

IMAGING LENS, MANUFACTURING METHOD AND IMAGING UNIT THEREFOR

RELATED APPLICATIONS

This application is a U.S. National Phase Application under 35 USC 371 of International Application PCT/JP2009/062111 filed Jul. 2, 2009.

This application claims the priority of Japanese application 2008-175686 filed Jul. 4, 2008, the entire content of which is hereby incorporated by reference.

TECHNICAL FIELD

The present invention relates to an imaging lens, manufacturing method and imaging unit thereof, and for example, relates to the imaging lens including a wafer level lens suited for mass production, wherein an optical image is formed on the light receiving surface of an image pickup element (e.g., solid image pickup element such as a CCD (Charge Coupled Device) type image sensor and CMOS (Complementary Metal-Oxide Semiconductor) type image sensor).

BACKGROUND

Various types of optical systems having a wafer level lens have been proposed in the conventional art (for example, Patent Literatures 1 and 2). To manufacture a wafer level lens, a great number of lens portions are manufactured to be arranged on a glass substrate, and the lens having been manufactured is cut off, thereby reducing the production cost. One of the important points is how to arrange the greatest possible number of lens portions, and the lens portions are required to be placed at the closest possible position to one another. In the meantime, in the optical system of an imaging lens and others, such an intervening object as a spacer or lightproof plate need to be placed between the lenses in order to determine the lens distance and to cut off stray light When a wafer level lens is used to manufacturer an imaging lens, assembling and cutting operations are performed with an intervening object sandwiched between glass substrates. If the space between lenses is very small, the intervening object may move during the cutting operation. To prevent this, the space is restricted.

PRIOR ART

Patent Literature

Patent Literature 1: Japanese Translation of PCT International Application Publication No. 2007-524243
Patent Literature 2: Japanese Translation of PCT International Application Publication No. 2008-508545

SUMMARY OF THE INVENTION

Problems to be Solved by the Invention

Because of the aforementioned restrictions, when manufacturing the wafer level lens proposed conventionally, it is difficult to find cutting conditions capable of avoiding cracking and chipping, if there is an increase in the type of material. This reduces the range of selecting the cutting conditions. Further, the lens may be distorted by the force applied at the time of cutting, with the result that high performances of the imaging lens cannot be obtained easily.

In view of the problems described above, it is an object of the present invention to provide an imaging lens characterized by easy production and high performances, as well as the manufacturing method and imaging unit thereof.

Means for Solving the Problems

An object of the present invention can be achieved by the following structures.

1. An imaging lens including at least one set of junction type compound lenses facing each other, each of the junction type compound lenses including a parallel tabular lens substrate and a lens portion formed on at least one of substrate surfaces of the lens substrate, wherein a space holding portion made of a same material as a material of the lens portion is formed outside an effective aperture of one of the junction type compound lenses facing each other, and wherein a mating face provided on a surface of the space holding portion is placed in direct contact with a mating face provided at a position facing the mating face of the space holding portion, outside an effective aperture of another facing junction type compound lens among the junction type compound lenses.

2. An imaging lens including at least one set of junction type compound lenses facing each other, each of the junction type compound lenses including a parallel tabular lens substrate and a lens portion formed on at least one of substrate surfaces of the lens substrate, wherein a space holding portion made of a same material as a material of the lens portion is formed outside effective apertures of the junction type compound lenses facing each other; and wherein mating faces, each of which is provided on an opposing surface of the space holding portion formed on each of the junction type compound lenses facing each other are placed in direct contact with each other.

3. The imaging lens described in the above item 1 or 2, wherein the junction type compound lenses facing each other includes a first junction type compound lens located closest to an object, and a second junction type compound lens arranged on an image side of the first junction type compound lens so as to face the first junction type compound lens, and the first junction type compound lens includes, in order of alignment from the object, a first-a lens portion with a convex surface facing the object, a first lens substrate, and a first-b lens portion with a concave surface facing an image, and the second junction type compound lens includes, in order of alignment from the object, a second-a lens portion with a concave surface facing the object and a second lens substrate.

4. The imaging lens described in any one of the above items 1 through 3, further including:

an opaque lightproof sheet between the junction type compound lenses facing each other, outside effective apertures of the junction type compound lenses.

5. The imaging lens described in any one of the above items 1 through 4, wherein a linear recessed portion is formed on a part of the space holding portion.

6. The imaging lens described in any one of the above items 1 through 5, further including:

a warpage preventive function on a substrate surface of the lens substrate, opposite to a substrate surface on which the space holding portion is formed.

7. The imaging lens described in the above item 6, wherein the warpage preventive function is made of a resin layer 8. The imaging lens described in the above item 6,
wherein the warpage preventive function is made of a thin film.

9. The imaging lens described in any one of the above items 1 through 8,
wherein the space holding portion is formed around the lens portion of a junction type compound lens which has a larger effective aperture among the junction type compound lenses facing each other, by increasing a thickness of a resin layer made of a same material as a material of the lens portion.

10. The imaging lens described in any one of the above items 1 through 9,
wherein a following conditional expression (1) is satisfied.

$$tl/tb < 3.0 \quad (1)$$

wherein "tl" indicates a thickness from the mating face of the space holding portion to the lens substrate, and "tb" indicates a thickness of the lens substrate.

11. The imaging lens described in any one of the above items 1 through 10, which includes a junction type compound lens located closest to the object, and a following conditional expression (2) is satisfied.

$$0.5 < f1/f < 1.3 \quad (2)$$

wherein "f1" indicates a focal distance of the junction type compound lens closest to the object, and "f" indicates a composite focal distance of an entire imaging lens system.

12. The imaging lens described in the above item 3 consisting of only the first junction type compound lens and the second junction type compound lens,
wherein a following conditional expression (2c) is satisfied.

$$0.65 < f1/f < 0.90 \quad (2c)$$

wherein "f1" indicates a focal distance of a junction type compound lens closest to the object, and "f" indicates a composite focal distance of an entire imaging lens system.

13. The imaging lens described in the above item 12,
wherein a following conditional expression (3) is satisfied.

$$0.10 < d/f < 0.35 \quad (3)$$

wherein "d" indicates a distance between lens substrates of two junction type compound lenses which have been united, and "f" indicates a composite focal distance of an entire imaging lens system.

14. An imaging unit including the imaging lens of any one described in the above items 1 through 13 and an image pickup element.

15. A method of manufacturing an imaging lens including at least one set of junction type compound lenses facing each other, each of the junction type compound lenses including a parallel tabular lens substrate and a lens portion formed on at least one of substrate surfaces of the lens substrate, the method including the steps of:

forming a space holding portion made of a same material as a material of the lens portion outside an effective aperture of one of the junction type compound lenses facing each other; and bonding to fix the junction type compound lenses facing each other together during assembling, while placing a mating face provided on a surface of the space holding portion in direct contact with a mating face provided at a position facing the mating face of the space holding portion, outside an effective aperture of another facing junction type compound lens among the junction type compound lenses.

16. A method of manufacturing an imaging lens including at least one set of junction type compound lenses facing each other, each of the junction type compound lenses including a parallel tabular lens substrate and a lens portion formed on at least one of substrate surfaces of the lens substrate, the method including the steps of:

forming a space holding portion made of a same material as a material of the lens portion outside effective apertures of both of the junction type compound lenses facing each other; and bonding to fix the junction type compound lenses facing each other together during assembling, while placing mating faces, each of which is provided on an opposing surface of the space holding portion formed on each of the junction type compound lenses facing each other in direct contact with each other.

Effects of the Invention

According to the present invention, the space between the junction type compound lenses facing each other is held by the space holding portion formed outside the effective aperture of one or both of junction type compound lenses facing each other. The mating face provided on the surface of the space holding portion is placed in direct contact with the mating face provided outside the effective aperture of the other opposite junction type compound lenses at a position facing the mating face of the space holding portion, or the mating faces provided on the opposing surfaces of the space holding portion formed on both of the junction type compound lens facing each other are brought in direct contact with each other, whereby easy forming and manufacturing is ensured, without the thickness of the space holding portion being increased much over the thickness of the effective aperture portion of the lens.

Further, the space holding portion is made of the same material as that of the lens portion. This increases the range of selection of the cutting conditions, and reduces the distortion of the lens shape caused by the force applied in cutting operations, whereby the high performance of the imaging lens is enhanced. Thus, this arrangement provides an imaging lens and imaging unit characterized by both easy production and high performances.

BRIEF DESCRIPTION OF THE DRAWINGS

FIGS. 11a, 11b and 11c are aberration diagrams in the optical system of the example 1.

FIGS. 13a, 13b and 13c are aberration diagrams in the optical system of the example 2.

FIGS. 17a, 17b and 17c are aberration diagrams in the optical system of the example 4.

FIGS. 21a, 21b and 21c are aberration diagrams in the optical system of the example 6.

DETAILED DESCRIPTION OF THE PREFERRED EMBODIMENTS

Figure 1:
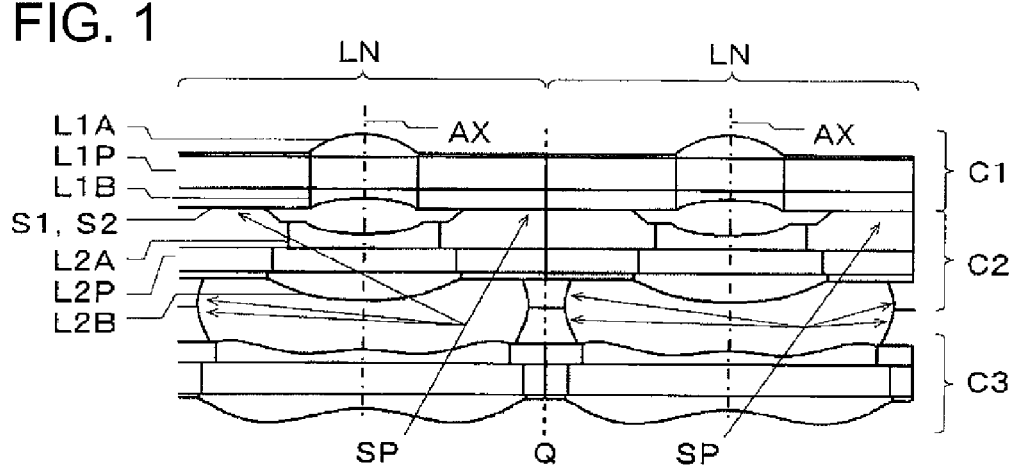
FIG. 1 is a schematic cross sectional view representing a first embodiment.

Referring to the drawings, the following describes an imaging lens, imaging unit, and the method of manufacturing the same. The same or equivalent portions among different embodiments will be assigned with the same symbols of reference, and will not be described to avoid duplication.

The imaging lens of the present invention is made of a lamination of two or more junction type compound lenses, and includes one or more sets of the junction type compound lenses so as to face each other. The "junction type compound lens" is defined as the tabular lamination type wafer level lens including a parallel tabular lens substrate and a lens portion formed on at least one of the substrate surfaces of the lens substrate. "Facing each other" refers to arrangement in mutually adjacent positions. The lens substrate and lens portion assumed in this case are made of different materials. The lens substrate is made of glass, while the lens portion is made of resin. If required, the same single material can be used.

The major point of the imaging lens, imaging unit, and the method of manufacturing the same in the present invention is found in that easy production by the wafer level and high performances of the imaging lens including the junction type compound lens can be ensured by eliminating the spacer member having been required in the conventional technique. A space holding portion made of the same material as that of the lens portion is formed outside the effective aperture of at least one of the junction type compound lenses facing each other, and the spacer function is implemented by direct contact between the mating face arranged on the surface of the space holding portion and that arranged on the other junction type compound lens at the position opposite to the space holding portion. Alternatively, it is also possible to arrange such a configuration that a space holding portion made of the material layer of the same material as that of the lens portion is provided respectively outside the effective aperture of two laminated junction type compound lenses. The mating faces on the surfaces of respective space holding portions are brought in direct contact to determine the space between lenses, whereby the space function is implemented. It is also possible to adopt such a structure that, to determine the space in the direction of optical axis for another junction type compound lens or other optical element located adjacent to the object side or image side of the junction type compound lens, the space holding portion made of the same material as that of the lens portion is arranged outside the effective aperture of the lens portion, whereby the spacer function is implemented.

The effective aperture is defined as the maximum diameter of the imaging lens that allows passage of the group of beams contributing to the formation of an image on the final image surface. When an image pickup element is present on the final image surface, the effective aperture denotes the diameter that allows the passage of the group of beams contributing to the formation of an image with the maximum image height on the image pickup element. The "material layer" refers to the resin layer formed of the same material as that of the lens portion, around the lens portion. Of the material layer, the portion used to hold the space in the direction of optical axis of the lens is called the "space holding portion". "Direct contact" also includes the contact wherein a bonding layer is used between the mating faces.

In the aforementioned structure, the space between junction type compound lenses facing each other or the space between the junction type compound lens and another optical element is held by the space holding portion formed outside the effective aperture of one or both of the junction type compound lenses facing each other. Easy formation, without the thickness of the space holding portion being much increased over the thickness of the effective aperture of the lens, is ensured by direct contact between the mating face provided on the surface of the space holding portion and the mating face provided on the other opposite junction type compound lens at a position opposite to the mating face of the space holding portion outside the effective aperture, or by direct contact between the mating faces on the mutually opposing surfaces of the space holding portions formed on both junction type compound lenses facing each other. Accordingly, easy production is ensured.

Since the space holding portion is made of the same material as that of the lens portion, the range of selecting the cutting conditions is expanded, and the distortion in the shape of the lens caused by the cutting force is reduced, with the result that performances of the imaging lens are enhanced. This arrangement provides an imaging lens characterized by easier production and higher performances. This permits production of a high-performance imaging unit, by which the image of a subject is optically captured by a combination of the imaging lens and image pickup element and is outputted in the form of an electric signal. The following describes the details of this invention with reference to specific examples.

Figure 2A:
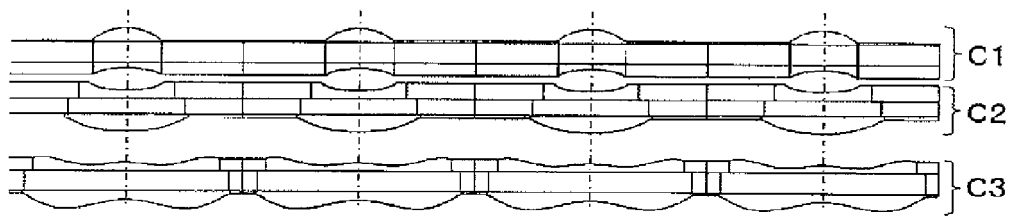
FIGS. 2A and 2B are schematic cross sectional views representing a reference example to describe the first embodiment.
Figure 2B:
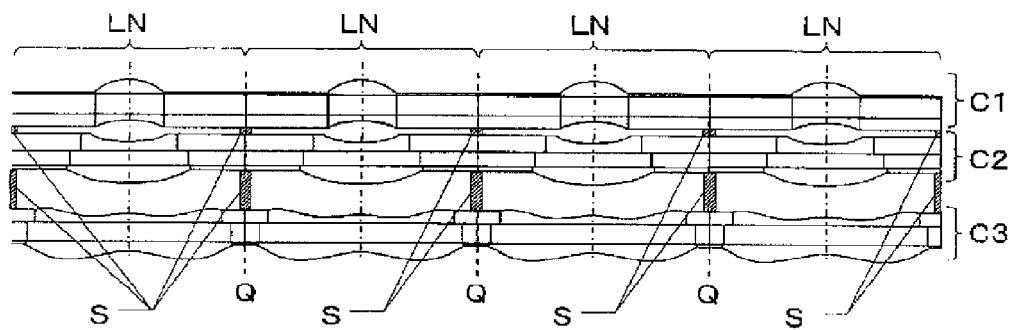

FIG. 1 shows a first embodiment of the imaging lens LN. FIGS. 2A and 2B show a reference example where the imaging lens LN having the same structure as that of the first embodiment is produced using a spacer member. As shown in FIG. 2A, when laminating the first through third junction type compound lenses C1 through C3 where a great number of lens portions are formed on the lens substrate, it is necessary to maintain and manage the air space between the first junction type compound lens C1 and second junction type compound lens C2 and that between the second junction type compound lens C2 and third junction type compound lens C3. Thus, a spacer member S is placed in the air space between the first junction type compound lens C1 and second junction type compound lens C2 and that between the second junction type compound lens C2 and third junction type compound lens C3, and is bonded and fixed in position, as shown in FIG. 2B. The imaging lens LN having the first through third junction type compound lenses C1 through C3 can be produced by cutting at position Q of the spacer member S.

Similarly to the imaging lens LN of FIGS. 2A and 2B, the imaging lens LN of FIG. 1 is made of the first through third junction type compound lenses C1 through C3. The first junction type compound lens C1 is made of a lens substrate L1P and lens portions L1A and L1B formed on both sides thereof. The second junction type compound lens C1 is made of a lens substrate L2P and lens portions L2A and L2B formed on both sides thereof. The third junction type compound lens C3 is also made in the same structure. In the imaging lens LN of FIG. 1, the spacer member S of FIG. 2B is replaced by the space holding portion SP. For example, for the first junction type compound lens C1 and second junction type compound lens C2, the space holding portion SP thereof is made of the material layer formed simultaneously with the formation of the lens portion L2A using the same resin as the constituent material of the lens portion L2A. The space holding portion SP is formed outside the effective aperture of the group of beams entering the second junction type compound lens C2. The spacer function is implemented by direct contact between the mating face S2 provided on the surface of the space holding portion SP on the side of the lens portion L2A and the mating face S1 on the side of the opposing lens portion L1B. To be more specific, the mating face S2 provided on the surface of the space holding portion SP made of the same material layer as that of the lens portion L2A is formed outside the effective aperture of the group of beams passing between first junction type compound lens C1 and second junction type compound lens C2. The mating face S1 is formed at the position facing the mating face S2 of the lens portion L1B. The space between the first junction type compound lens C1 and second junction type compound lens C2 (i.e., the space between the lenses in the direction of optical axial AX) is determined by direct contact between the mating faces S1 and S2.

The first junction type compound lens C1 and second junction type compound lens C2 are fixed in position by bonding the mating face S1 and mating face S2. For the second junction type compound lens C2 and third junction type compound lens C3, the air space is defined by the space holding portion SP formed outside the effective aperture. The imaging lens LN containing the first through third junction type compound lenses C1 through C3 can be structured by cutting at position Q of the mating face S1 and mating face S2. A commonly used adhesive (e.g., UV curable adhesive) can be used for bonding between the mating face S1 and mating face S2. For bonding the mating face S1 and mating face S2, the materials used to form the mating face S1 and mating face S2 are preferably the same as each other. If the mating face S1 and mating face S2 are made of the same material, it is only required to select one type of adhesive conforming to that material.

As described above, the imaging lens LN of FIG. 1 does not use the spacer member. This structure reduces the number of the component parts, assembling processes and management items (wall thickness, adhesive, etc.), and facilitates assembling work. This provides a lower cost and higher precision in assembling due to the reduced number of error factors, with the result that precision of the imaging lens LN is enhanced. For example, this structure increases the areas of the mating faces S1 and S2 for defining the space between the first junction type compound lens C1 and second junction type compound lens C2, and of the space holding portion SP, with the result that the space precision is also improved and stabilized. The mating faces S1 and S2 are made of the material layer formed of the same resin as that of the lens portions L1B and L2A. The space holding portion SP is made of the material layer formed of the same resin as that of the lens portion L2A. This arrangement increases the range of selecting the cutting conditions, and reduces the distortion of the lens shape (deformation of the optical effective surface) caused by the force applied in cutting operations, whereby the high performance of the imaging lens LN is ensured. It should be noted that the aforementioned structure can also be used, when the space holding portion SP is used to define the spaces in the direction of optical axis AX for the optical elements other than the junction type compound lens, located adjacent to each other on the object or image side of the junction type compound lens C2.

In the imaging lens LN of FIG. 1, for example when the overall length of the lens is 4.2 mm, the pitch in the arrangement of the imaging lens LN is 4.5 mm, and the space between the second junction type compound lens C2 and third junction type compound lens C3 is 0.63 nun, the space between the first junction type compound lens C1 and second junction type compound lens C2 is only 0.16 mm. When laminating such junction type compound lenses in a very limited space, it is easy that the material layer made of the same resin as that of the lens portion L2A (or lens portion L1B) is mounded thicker than usual, by the amount equivalent to that of the spacer and the space holding portion SP is formed outside the effective aperture. The management of the space in conformity to the thickness of the material layer will also be easy. To be more specific, there are variations in the thickness of the current lens substrate, thus, the management is conducted by controlling the thickness of the material layer. However, the thicknesses of the material layer including the lens core thickness is determined simultaneously in one process of formation. Accordingly, this control procedure can be directly used to control the space of the junction type compound lens. Incidentally, if a material layer is formed only on one side of the lens substrate, a problem may occur in the process of curing. Accordingly, the material layer (resin layer) is preferably formed on both sides of the lens substrate, as will be described later. This will effectively eliminate an error in the core thickness of the lens substrate.

If a spacer member S is used as shown in FIG. 2B, it will become necessary to control the thickness of the spacer member S, in addition to the thickness of two lens portions facing each other (relative position of two surfaces of the lenses with respect to each lens substrate). To put it another way, it will become necessary to manage three thicknesses including the thickness of the spacer member S. By contrast, the structure of the aforementioned first embodiment permits simultaneous management of the thicknesses of the lens portion L2A and space holding portion SP (wherein the thickness of the spacer portion alone need not be managed). It is only required that the relative position of the lens portions L1B and L2A and mating faces S1 and S2 with respect to the substrate surfaces (i.e., thickness of the material layer) is separately managed for each of the first junction type compound lens C1 and second junction type compound lens C2. This determines the positional relationship between the lens surfaces facing each other (i.e., space between lens surfaces in the direction of the optical axis AX), and provides an advantage of easy production, without the thickness of the space holding portion SP becoming much greater than that of the effective aperture. Further, two bonding surfaces will be created if a spacer member S is used and this will require two bonding operations. However; if the spacer member S need not be used, only one bonding surface, hence, only one bonding operation is required. This leads to improvement of overall precision.

As shown in the first embodiment (FIG. 1), the space holding portion SP is preferably produced by increasing the thickness of the material layer (the resin layer made of the same resin as that of the lens portion L2A) outside the effective aperture on the side where the lens portion of a wider effective aperture is formed among the junction type compound lenses C1 and C2 facing each other. The concave surface (lens portion L2A) of the second junction type compound lens C2 has a greater effective aperture than the concave surface (lens portion L1B) of the first junction type compound lens C1. If the space holding portion SP is formed on the concave surface of the first junction type compound lens C1 to provide a spacer function, the space holding portion SP may overlap the effective aperture of the concave surface of the second junction type compound lens C2. If the space holding portion SP is formed on the concave surface of the second junction type compound lens C2 having a larger effective apparture, the effective optical path preferably may be prevented from being blocked.

Figure 3:
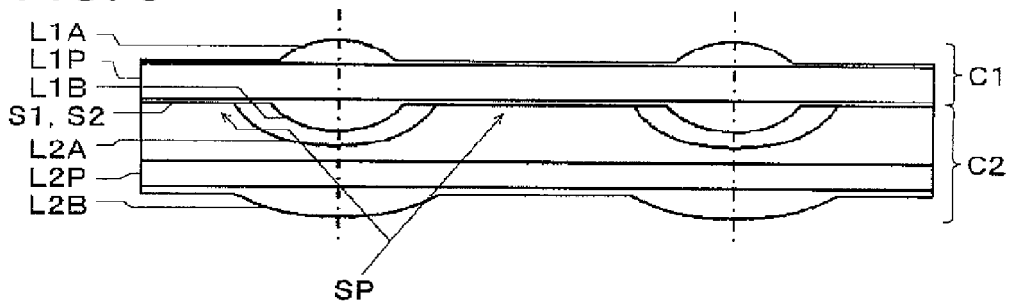
FIG. 3 is a schematic cross sectional view representing the major portions in a second embodiment.
Figure 4:
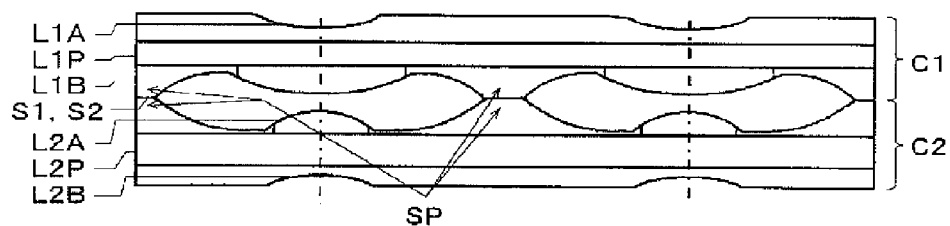
FIG. 4 is a schematic cross sectional view representing the major portions in a third embodiment.
Figure 5:
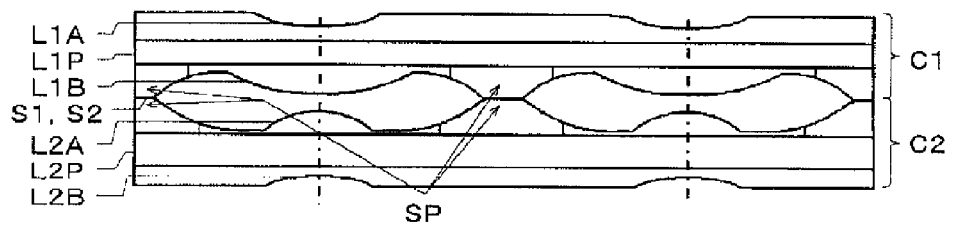
FIG. 5 is a schematic cross sectional view representing the major portions in a fourth embodiment.

In the aforementioned first embodiment (FIG. 1), the surfaces of the lens portions L1B and L2A facing each other are both concave. However, when the spacer function is to be implemented by the mating faces S1 and S2 or space holding portion SP, the shape of the surface is not restricted to the aforementioned one. FIGS. 3 through 5 show the examples of the second through fourth embodiments of the imaging lens LN for this. In the second embodiment (FIG. 3), the lens portion L1B is convex, while the lens portion L2A is concave. Similarly to the case of the first embodiment (FIG. 1), a space holding portion SP is formed on the side of the lens portion L2A. The wide mating faces S1 and S2 ensure a higher level of precision and stability in the space between the first and second junction type compound lenses C1 and C2. In the third embodiment (FIG. 4), both the lens portions L1B and L2A are convex. Further, in the fourth embodiment (FIG. 5), both the lens portions L1B and L2A have a convex shape with an inflection point. In the third and fourth embodiments, the same structure is used except that the effective apertures are different. This structure can be used in common for the imaging lenses LN having different specifications.

Figure 6:
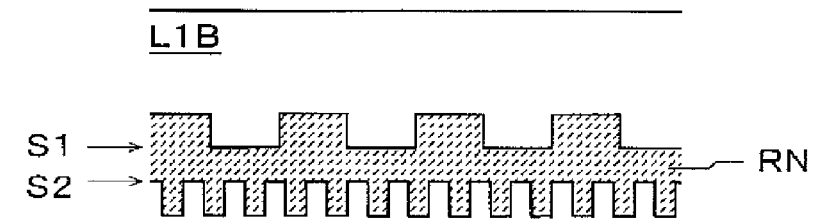
FIG. 6 is a schematic cross sectional view representing the major portions in a fifth embodiment.
Figure 7:
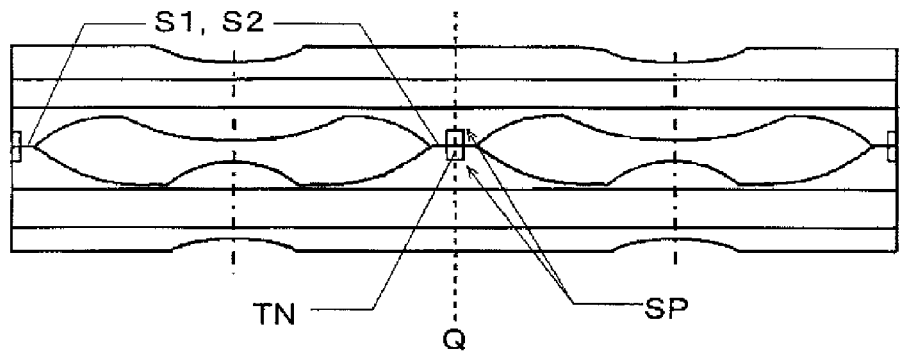
FIG. 7 is a schematic cross sectional view representing the major portions in a sixth embodiment.

In the first embodiment (FIG. 1), the mating faces S1 and S2 are flat. However, the surfaces of the mating faces S1 and S2 can be processed, wherever required. FIGS. 6 and 7 show the fifth and sixth embodiments of the imaging lens LN as examples for this. In the fifth embodiment (FIG. 6), the surfaces of the mating faces S1 and S2 are processed in the form of meshes having different pitches from each other. Processing in the form of meshes having different pitches is applied to the mating faces S1 and S2, thereby reducing the amount of the adhesive present between the mating faces S1 and S2 in the bonded layer RN. This reduces the variations in the thickness of adhesive, and hence ensures easy control of the space.

The sixth embodiment (FIG. 7) shows the third and fourth embodiments (FIGS. 4 and 5) wherein a linear recess TN for material reduction and cutting are formed on part of the mating faces S1 and S2 (space holding portion SP). Formation of the linear recess TN for cutting allows the resin reduction (material reduction) when the mating faces S1 and 52 are formed. The time of formation can be reduced by the amount equivalent to the reduced amount in thickness. Further, the thickness of the material layer made up of the resin on the cut surface is partly reduced by the method of cutting at the position Q passing through the linear concave TN. This ensures easy cutting. Further, this arrangement reduces the distortion of the lens shape (deformation on the optical effective surface) caused by the force applied in cutting operations, whereby the higher performance of the imaging lens LN is ensured).

Figure 8A:
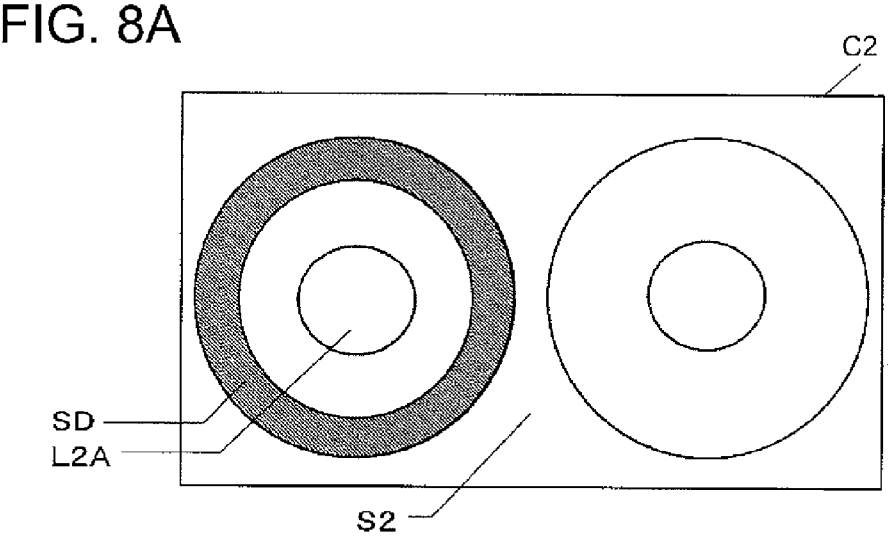
FIGS. 8A, 8B and 8C are schematic cross sectional views representing the major portions in a seventh embodiment.
Figure 8B:
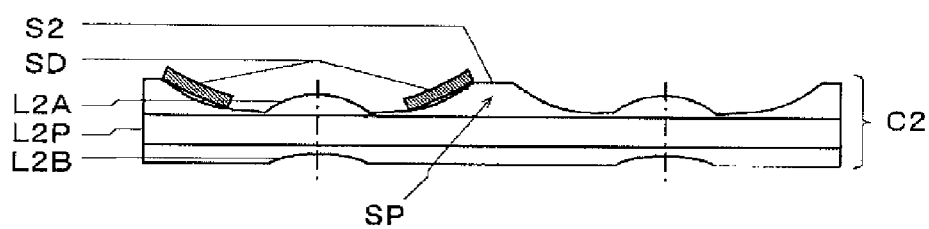
Figure 8C:
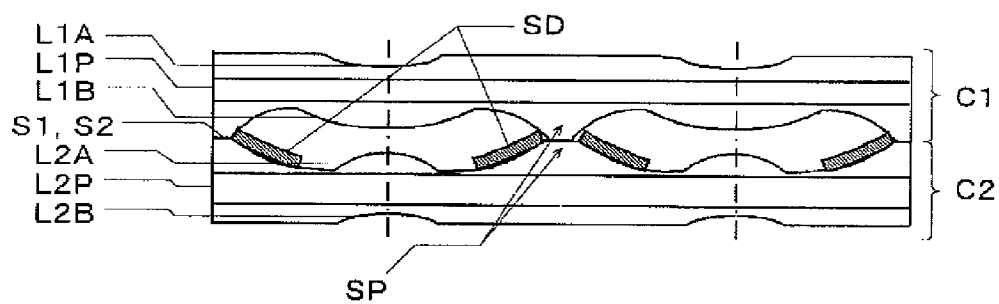

In the first embodiment (FIG. 1), no optical member is arranged between the first junction type compound lens C1 and second junction type compound lens C2. However, an optical member can be arranged whenever required. To give one example, FIGS. 8A, 8B and 8C show the seventh embodiment of the imaging lens LN. The plan view of FIG. 8A and cross sectional view of FIG. 8B shows that the second junction type compound lens C2 prior to lamination is covered with an opaque lightproof sheet SD having a lightproof function as an aperture stop or stray light preventive light bundle regulating plate (wherein the opaque sheet SD is shown only for a part outside the effective aperture of the lens portion L2A). Further, the cross sectional view of FIG. 8C shows lamination of the first junction type compound lens C1 and second junction type compound lens C2 together with the opaque sheet SD. As will be apparent from FIG. 8C, an opaque lightproof sheet SD is provided outside the effective aperture between the first junction type compound lens C1 and second junction type compound lens C2 facing each other. The lens structure of the seventh embodiment (FIGS. 8A, 8B and 8C) is the same as those of the third and fourth embodiments (FIGS. 4 and 5).

For example, a dry film resist or commonly used adhesive sheet having a lightproof function can be use as the opaque sheet SD. The opaque sheet SD is preferably adhered closely to the material layer made of resin. If fixing stability can be maintained between the first junction type compound lens C1 and second junction type compound lens C2, the sheet SD need not be adhered closely to the material layer. Here, application of a plurality offing-like sheets is assumed. However, an opaque sheet with a plurality of openings can be applied. In this case, a hole for allowing direct contact of the mating faces S1 and S2 need also be provided. The lightproof portion of the opaque sheet SD is required only to cover the required range outside the effective aperture. However, more preferably, the lightproof portion covers the range outside the effective aperture up to be close to the effective aperture. It should be noted that the structure of the aforementioned opaque lightproof sheet SD is also applicable when the space holding portion SP is used to define the space in the direction of optical axis AX for the optical element other than the junction type compound lens located adjacent to each other on the object or image side of the junction type compound lens C2. To put it another way, the opaque lightproof sheet SD can be placed outside the effective aperture between the junction type compound lens and other optical elements located adjacent to each other on the object or image side of the junction type compound lens.

According to the aforementioned first through seventh embodiments, in both the first junction type compound lens C1 and second junction type compound lens C2, lens portions L1A, L1B; L2A, L2B are formed on both the substrate surfaces of each of the lens substrate L1P and lens substrate L2P. The aforementioned structure of using the space holding portion SP and others to implement the spacer function is applicable to the imaging lens including the junction type compound lens where the lens portion is formed only on one of the substrate surfaces of the lens substrate. However, if the lens portion is formed only on one side of the lens substrate, the lens substrate will be bent by the curing of the resin material constituting the lens portion. This may cause the entire junction type compound lens to be warped. On the wafer level, this has a serious impact on the performance. To solve this problem, for the lens substrate, the warpage preventive function is preferably provided on the substrate surface on the side opposite of the substrate surface on the side where the lens portion is formed. The following describes the warpage preventive function with reference to the cross sectional view of the major section in FIGS. 9A, 9B and 9C, where an example is taken from the eighth embodiment.

Figure 9A:
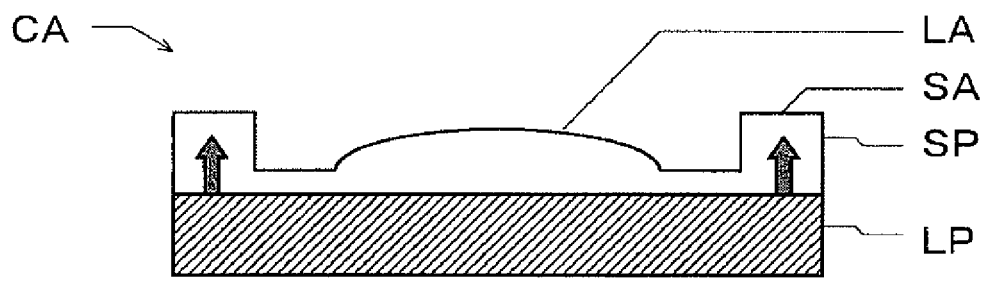
FIGS. 9A, 9B and 9C are schematic cross sectional views representing the major portions in an eighth embodiment.
Figure 9B:
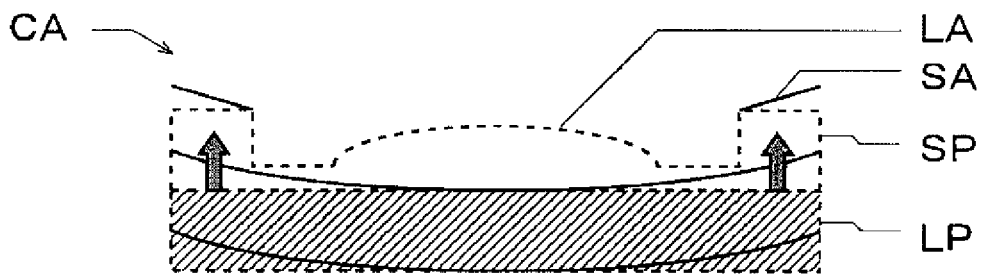
Figure 9C:
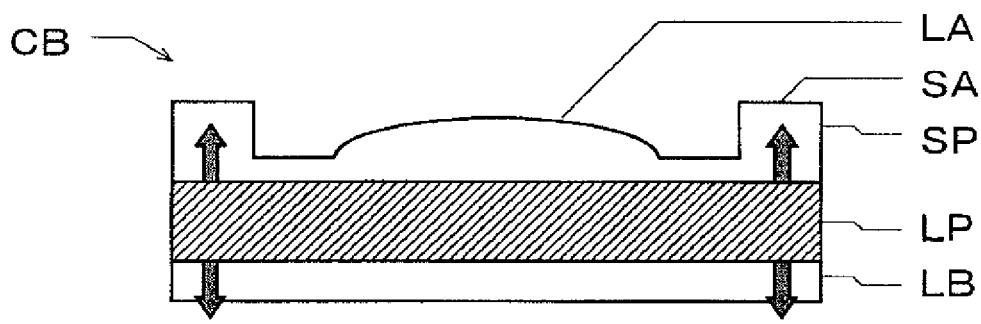

FIG. 9A shows the junction type compound lens CA where the lens portion LA and material layer (including the space holding portion SP and mating face SA) are formed only on the substrate surface on one side of the lens substrates LP. FIG. 9C shows the junction type compound lens CB where the lens portion LA and material layer (including the space holding portion SP and mating face SA) are formed on the substrate surface on one side of the lens substrate LP, while the resin layer LB is formed on the other substrate surface. In the junction type compound lens CA of FIG. 9A where the material layer is formed only on one side of the lens substrates LP, the rear surface of the lens substrate LP has no warpage preventive function. Accordingly, a force of shrinkage (indicated by a bold arrow) will be caused by the curing of the resin, and the lens substrate LP will be bent, as shown in FIG. 9B. Thus, the precision of the imaging lens will be deteriorated by the warpage produced on the entire junction type compound lens CA.

In the junction type compound lens CB of the eighth embodiment, as shown in FIG. 9C, the resin layer LB is formed on the rear side of the lens substrate LP (i.e., the substrate surface of the lens substrate LP, opposite the substrate surface on the side where the lens portion LA, mating face SA and space holding portion SP are formed). The warpage preventive function is implemented by this resin layer LB. To be more specific, the shrinkage force caused by the curing of the resin is cancelled by the lens portion LA and the material layer provided on one of the substrate surfaces, and the resin layer LB provided on the other substrate surface, whereby the warpage of the lens substrate LP is reduced, with the result that a high-precision imaging lens is produced.

FIG. 9C shows that the entire surface of the lens substrate LP is provided with the resin layer LB. The resin layer LB can be formed only on a part of the lens substrate LP, e.g., outside the effective aperture. It is also possible to arrange such a configuration that the structure equivalent to the mating face SA or space holding portion SP is formed on the resin layer LB, so that the aforementioned spacer function is implemented. To cancel the shrinkage force caused by the curing of the resin constituting the lens portion LA, it is also possible to implement the warpage preventive function by providing (coating) a thin film such as a reflection preventive film instead of the resin layer LB.

The thickness of the space holding portion constituting the mating face preferably meets the following conditional expression (1):

$$tl/tb < 3.0 \quad (1)$$

wherein "tl" indicates the thickness from the mating face to the lens substrate, and "tb" denotes the thickness of the lens substrate.

The conditional expression (1) defines the preferred range of conditions for the thickness of the space holding portion with respect to the thickness of the lens substrate. When conditional expression (1) is met, costs can be reduced without the entire optical length being affected, even if the warpage preventive function on the rear surface of the lens substrate is added. If the space holding portion constituting the mating face is thick, a thick resin layer will have to be provided on the opposite side as well. This will require expansion of the space on the side opposite the mating face, with the result that the overall optical length will be increased. Further, much resin will have to be used, and a cost increase will result. Nan attempt is made to prevent warpage by coating, the coated layer will be thick. This will also increase the cost.

The conditional expression (1a) is preferably met, and the conditional expression (1b) is more preferably met:

$$tl/tb < 2.0 \quad (1a)$$

$$tl/tb < 1.5 \quad (1b)$$

In the range of conditions defined by the conditional expression (1), these conditional expressions (1a) and (1b) define a still more preferable range of conditions, based on the aforementioned viewpoint. The aforementioned effects will be further increased if the conditional expression (1a) is preferably met, or if the conditional expression (1b) is further preferably met.

For the overall length of the imaging lens, the imaging lens includes the junction type compound lens closest to the object, preferably meets the following conditional expression (2):

$$0.5 < f1/f < 1.3 \quad (2)$$

wherein "f1" indicates the focal distance of the junction type compound lens closest to the object, and "f" denotes the composite focal distance of the entire imaging lens system.

The conditional expression (2) defines the preferred range of conditions in the sense of reducing the overall length of the imaging lens (i.e., to reduce a space between the junction type compound lenses). To reduce the overall length of the lens, it is most effective to adjust the power of the junction type compound lens closest to the object so as to meet the conditional expression (2). Further, reduction of the space between the junction type compound lenses will result in a reduction of the height from the substrate surface to the mating face (i.e., to reduce the thickness of the space holding portion). An excessive increase in the power of the junction type compound lens closest to the object or in the thickness of the lens portion is not caused by exceeding the lower limit of the conditional expression (2). The entire length of the lens portion can be reduced by keeping the value below the upper limit of the conditional expression (2). As a result, the space between the junction type compound lenses can be reduced.

The following conditional expression (2a) is more preferably met:

$$0.6 < f1/f < 1.1 \quad (2a)$$

This conditional expression (2a) defines a more preferred range of conditions based on the aforementioned viewpoint in the range of conditions defined by the aforementioned conditional expression (2). When the conditional expression (2a) is preferably met, the aforementioned effects will be fluffier increased.

Further, the imaging lens is made of two junction type compound lenses, i.e., a first junction type compound lens located closest to the object and a second junction type compound lens facing the first junction type compound lens and located on the image side thereof. The first junction type compound lens is provide with a first lens portion having a convex facing the object, and a first lens substrate and a second lens portion having a concave facing the image, in order of alignment from the object. The second junction type compound lens is provided with a third lens portion having a concave facing the object and a second lens substrate, in order of alignment from the object. It is preferred that the internal lens portions both have concave surfaces, if the mating faces of the space holding portion facing each other are bonded. In this case, the imaging lens preferably meets the following conditional expression (2c):

$$0.65 < f1/f < 0.90 \quad (2c)$$

When the conditional expression (2c) is met, the overall length of the imaging lens can be reduced with the performances of the imaging lens being maintained. This arrangement suppresses the aberration resulting from the power of the first junction type compound lens C1 being excessively increased when the value is kept below the upper limit of the conditional expression (2c). When the value is kept over the lower limit of the conditional expression (2c), the first junction type compound lens will have an increased power. This allows the overall length of the imaging lens to be reduced, and preferably permits the space to be reduced between the junction type compound lenses.

If the aforementioned conditional expression (2c) has been met, the space between the junction type compound lenses can be reduced. It is further preferred for the junction type compound lens to meet the conditional expression (3):

$$0.10 < d/f < 0.35 \quad (3)$$

wherein "d" indicates the distance between the lens substrates of two junction type compound lenses, and "f" denotes the composite focal distance of the entire imaging lens system.

The resin thickness from the substrate surface to the mating face can be optimized by meeting the conditional expression (3). If the value is kept below the upper limit of the conditional expression (3), the space between the substrates is reduced and the height to the mating face is also reduced, so that the thickness of the space holding portion can be reduced. When the overall length of the imaging lens is to be reduced, the lens closest to the object will be heavily convexed. To correct the aberration produced on the heavily convexed surface, a heavily concaved surface is required. If the value is increased over the lower limit of the conditional expression (3), the space between substrates will not be too small, and the degree of freedom in the shape of the lens portion of the junction type compound lens can be ensured. Thus, a heavily concave surface can be obtained. Even when the overall length is to be reduced, aberrations can be effectively corrected.

Under the optimum design conditions for an imaging lens, the overall optical length is 1.0 mm or more without exceeding 10 mm, or is 2.0 mm or more without exceeding 5.0 mm.

The following describes specific examples of the imaging lens. In each of the examples, the aperture stop S is formed by applying chromium vapor deposition directly to the surface of the lens substrate. Thus, the aperture stop S is not an intervening object mentioned in the description of BACKGROUND. Accordingly, the lens portion will not be misaligned at the aperture stop S at the time of cutting.

EXAMPLES

Example 1

Figure 10:
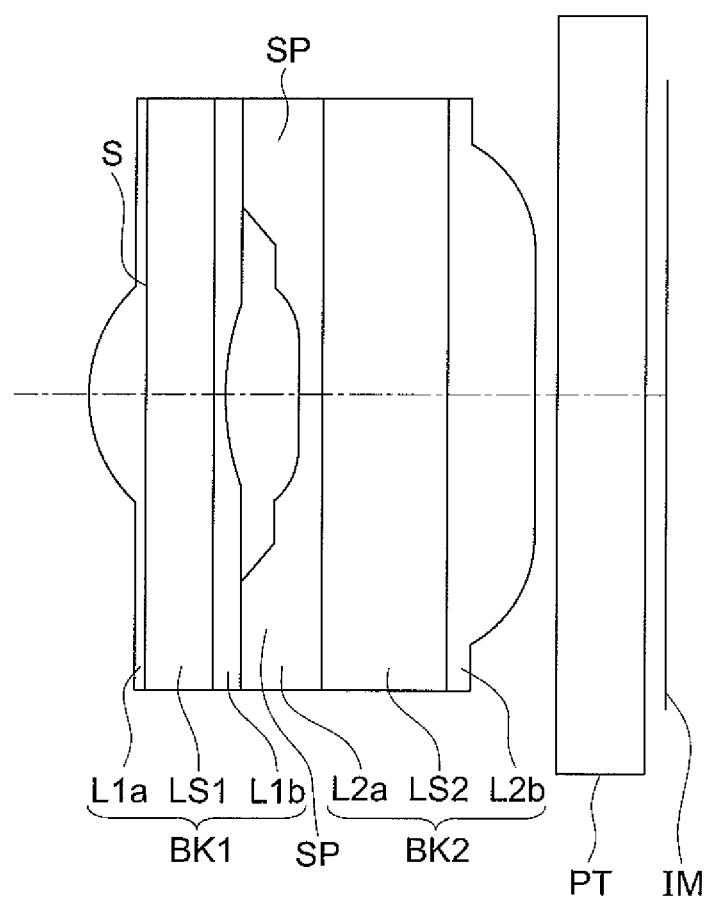
FIG. 10 is a cross sectional view representing an array of the lens group in the optical system of the example 1.

FIG. 10 is a cross sectional view representing an array of the lens group in the optical system of the example 1. FIGS. 11a, 11b and 11c are aberration diagrams in the optical system of the example 1. In the example 1, the space holding portion SP is formed only on the second-a lens portion L2a of the second junction type compound lens BK2, as shown in FIG. 1.

As shown in FIG. 10, the optical system of the example 1 includes the first junction type compound lens BK1 and second junction type compound lens BK2 arranged in that order from the object side to the image side. The first junction type compound lens BK1 includes a first-a lens portion L1a, aperture stop S, a lens substrate LS1 and a first-b lens portion L1b, and is provided with positive refracting power. The second junction type compound lens BK2 includes a second-a lens portion L2a, a second lens substrate LS2, and a second-b lens portion L2b, and has a negative refracting power. A parallel flat plate PT assumed to be an optical low-pass filter, an infrared cut filter or a seal glass of the solid image pickup element is provided on the image side of the second junction type compound lens BK2. Then an image surface IM of the solid image pickup element is arranged at the last position. All the surfaces of the lens portions in contact with air are aspherical.

In this structure, the light having entered from the object side passes through the first-a lens portion L1a, aperture stop S, first lens substrate LS1, first-b lens portion L1b, second-a lens portion L2a, second lens substrate LS2, second-b lens portion L2b and parallel flat plate PT in that order along the optical axis. The optical image of an object is formed on the light-receiving surface IM of the image pickup element.

The following shows the construction data on each lens in the optical system of the example 1. The numeral "ri" accompanied for each lens surface (wherein "i"=1, 2, 3, . . . ) indicates the "i-th" lens surface as counted from the object side (wherein the jointed surface of the lens is counted as constituting one surface). The surface where "ri" is affixed with "*" is aspherical. Both surfaces of the parallel flat plate PT are also counted as one surface. The aperture stop S has a negligibly small thickness, and therefore, is handled as constituting a part of the surface of the glass substrate where the aperture stop S is formed. This method of handling and the meaning of the symbols are applicable also to the examples 2 through 6 to be described later (FIGS. 12, 14, 16, 18, and 20). This does not mean, however, that the method of handling and the meaning of the symbols are exactly the same. For example, the same symbol (r1) is assigned to the lens surface located closest to the object throughout the drawings of examples 1 through 6. However, this does not signify that these curvatures are the same throughout the examples 1 through 6.

Numerical Example 1

| Unit mm | | | | | |
|---|---|---|---|---|---|
| Surface data | | | | | |
| Surface number | r | d | nd | vd | Effective radius |
| 1* | 0.825 | 0.30 | 1.513 | 55 | 0.56 |
| 2 (stop) | ∞ | 0.39 | 1.470 | 65 | 0.51 |
| 3 | ∞ | 0.07 | 1.590 | 30 | 0.50 |
| 4* | 2.307 | 0.41 | | | 0.50 |
| 5* | −2.856 | 0.14 | 1.570 | 35 | 0.58 |
| 6 | ∞ | 0.69 | 1.470 | 65 | 0.78 |
| 7 | ∞ | 0.49 | 1.570 | 35 | 1.31 |
| 8* | 9.805 | 0.10 | | | 1.39 |
| 9 | ∞ | 0.50 | 1.516 | 64 | 1.59 |
| 10 | ∞ | 0.16 | | | 1.71 |

Aspherical surface data

1st surface

K = 0.24110E−01, A4 = −0.76992E−02, A6 = 0.22116E+00,
A8 = −0.89518E+00, A10 = 0.76286E−01, A12 = 0.12557E+01,
A14 = 0.14692E+02, A16 = −0.81966E+01, A18 = −0.47815E+02,
A20 = −0.10647E+02

4th surface

K = 0.11699E+02, A4 = 0.15488E+00, A6 = −0.22486E+00,
A8 = 0.54011E+00, A10 = 0.94165E+01, A12 = −0.19387E+02,
A14 = 0.61351E+02, A16 = 0.85443E+02, A18 = −0.55073E+02,
A20 = −0.34318E+03

5th surface

K = −0.15936E+01, A4 = −0.57846E+00, A6 = 0.89746E+00,
A8 = −0.66050E+01, A10 = 0.11481E+02, A12 = −0.58783E+01,

-continued

Unit mm

A14 = −0.58713E+02, A16 = 0.12287E+03, A18 = 0.15861E+03,
A20 = −0.85648E+03
8th surface K = 0.16404E+02, A4 = −0.81453E−01, A6 = −0.24477E−01,
A8 = −0.78141E−02, A10 = 0.18887E−01, A12 = −0.84156E−02,
A14 = −0.28156E−02, A16 = 0.13636E−02, A18 = 0.66819E−03,
A20 = −0.26160E−03

Various forms of data

| | |
|---|---|
| Focal distance | 2.98 mm |
| F-number | 2.8 |
| Image height | 1.75 mm |
| Overall lens length | 3.25 mm |
| BF | 0.16 mm |
| Focal distance of BK1 | 2.24 mm |
| Focal distance of BK2 | −3.73 mm |

In the aforementioned surface data, "r" is a curvature radius (in units of "mm"); "d" is the distance between lens surfaces on the optical axis in the focused state at infinity, i.e., the distance of the surface on the axis (in units of "mm"); "nd" is a refractive index for the d-line of each lens (having a wavelength of 587.56 nm); and "vd" is an Abbe's number. Further, the effective radius (in units of "mm") on each surface is shown at the end of the surface data. Both surfaces of the parallel flat plate FT PT are flat and their curvature radius "r" is ∞ (infinite).

The aforementioned aspherical surface data indicates the quadric surface parameter (conical coefficient K) and the aspherical surface coefficient "Ai" (wherein i=4, 6, 8, 10, 12, 14, 16, 18, and 20) of the aspherical surface where the numeral "i" is affixed with "*" in the surface data. The aspherical surface coefficient "Ai" without description indicates 0 (zero). The aspherical shape of the optical surface is defined by the following formula using the local coordinate axis system (x, y, z), wherein the vertex of the surface is an origin, and the direction from the object toward the image pickup element is the positive direction of the z-axis:

$$z(h) = ch^2/[1+\sqrt{1-(1+K)c^2h^2}] + \Sigma A_i \cdot h^i$$

wherein z (h) is the displacement in the z-axis direction at height "h" (reference for the vertex of the surface); h is the height perpendicular to the z-axis ($h^2=x^2+y^2$); c is a paraxial curvature (=1/curvature radius); Ai is an i-th order aspherical surface coefficient; and K is a quadric surface parameter (conical coefficient). In the aforementioned aspherical surface data, "En" denotes "10 to the n-th power". For example, "E+01" denotes "10 to the 1st power". "E−03" denotes "10 to the −3rd power".

FIGS. 11a, 11b and 11c show the aberrations in the optical system of the example 1 based on the aforementioned lens arrangement and configuration. FIG. 11a indicates the spherical aberration (sine condition) (LONGITUDINAL SPHERICAL ABERRATION). FIG. 11b indicates the astigmatism (ASTIGMATISM FIELDCURVER). FIG. 11c indicates distortion (DISTORTION). The horizontal axis of the spherical aberration shows the difference of the focal position in units of mm. The vertical axis shows the value defined in terms of incident height. The horizontal axis of the astigmatism shows the difference of the focal position in units of mm. The vertical axis shows the image height in units of mm. The horizontal axis of the distortion indicates the percentage of the difference of an actual image height with respect to the ideal image height. The vertical axis shows the image height in units of mm. In the drawing of the astigmatism, the solid line denotes the sagittal form, and the broken line shows the tangential form. The drawing of the spherical aberration gives the aberrations of two wavelengths, wherein the solid line shows the d-line (having a wavelength of 587.56 nm) and the broken line indicates the g-line (having a wavelength of 435.84 nm). The drawings of the astigmatism and distortion shows the result when the aforementioned d-line (having a wavelength of 587.56 nm) is used. The aforementioned handling is also applicable to the construction data for example 2 through example 6 shown below, and FIGS. 13, 15, 17, 19, and 21 showing each aberration.

Example 2

Figure 12:
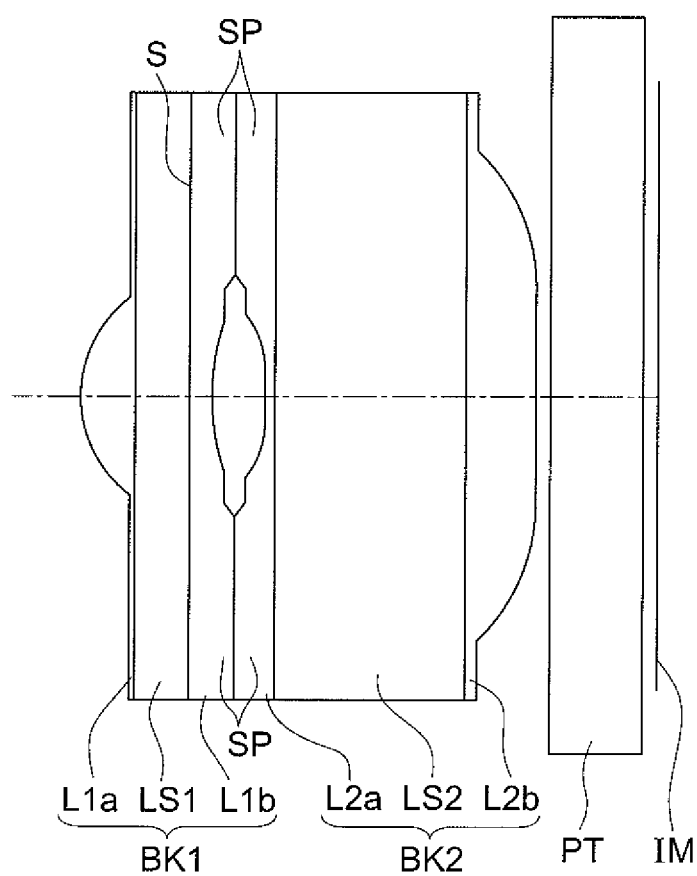
FIG. 12 is a cross sectional view representing an array of the lens group in the optical system of the example 2.

FIG. 12 is a cross sectional view representing an array of the lens group in the optical system of the example 2. FIGS. 13a, 13b and 13c are aberration diagrams in the optical system of the example 2. In the example 2, a space holding portion SP is formed on both the first-b lens portion L1b of the first junction type compound lens BK1 and second-a lens portion L2a of the second junction type compound lens BK2, as shown in FIG. 4.

As shown in FIG. 12, the optical system of the example 2 is formed of the first junction type compound lens BK1 and second junction type compound lens BK2, in order of array from the object to the image side. The first junction type compound lens BK1 includes a first-a lens portion L1a, first lens substrate LS1, aperture stop S and first-b lens portion L1b, and has a positive refracting power. The second junction type compound lens BK2 is composed of a second-a lens portion L2a, second lens substrate LS2 and second-b lens portion L2b, and has a negative refracting power. A parallel flat plate PT assumed to be an optical low-pass filter, an infrared cut filter, or a seal glass of the solid image pickup element is provided on the image side of the second junction type compound lens BK2. Then an image surface IM of the solid image pickup element is arranged at the last position. All the surfaces of the lens portions in contact with air are aspherical.

In this structure, the light having entered from the object side passes through the first-a lens portion L1a, first lens substrate LS1, aperture stop S, first-b lens portion L1b, second-a lens portion L2a, second lens substrate LS2, second-b lens portion L2b, and parallel flat plate PT in that order along the optical axis. The optical image of an object is formed on the light-receiving surface IM of the image pickup element.

The following shows the construction data on each lens in the optical system of the example 2.

Numerical Example 2

Unit mm

Surface data

| Surface number | r | d | nd | vd | Effective radius |
|---|---|---|---|---|---|
| 1* | 0.764 | 0.29 | 1.518 | 57 | 0.54 |
| 2 | ∞ | 0.30 | 1.520 | 62 | 0.51 |
| 3 (stop) | ∞ | 0.15 | 1.572 | 35 | 0.39 |
| 4* | 2.082 | 0.29 | | | 0.42 |
| 5* | −2.130 | 0.05 | 1.572 | 35 | 0.48 |
| 6 | ∞ | 1.10 | 1.470 | 65 | 0.59 |
| 7 | ∞ | 0.37 | 1.572 | 35 | 1.39 |
| 8* | 16.027 | 0.10 | | | 1.42 |
| 9 | ∞ | 0.50 | 1.520 | 62 | 1.59 |
| 10 | ∞ | 0.09 | | | 1.71 |

-continued

Unit mm

Aspherical surface data

1st surface

K = −0.27812E+00, A4 = 0.44933E−01, A6 = 0.13479E+01,
A8 = −0.10003E+02, A10 = 0.36674E+02, A12 = −0.44976E+02

4th surface

K = 0.12388E+02, A4 = 0.19713E−01, A6 = −0.38863E+00,
A8 = 0.14672E+02, A10 = −0.99560E+02, A12 = 0.28271E+03

5th surface

K = 0.85615E+01, A4 = −0.11599E+01, A6 = 0.12979E+02,
A8 = −0.1442E+03, A10 = 0.83342E+03, A12 = −0.26345E+04,
A14 = 0.36490E+04, A16 = −0.13746E+04

8th surface

K = −0.15883E+02, A4 = −0.12148E+00, A6 = 0.17573E+00,
A8 = −0.30311E+00, A10 = 0.29327E+00, A12 = −0.18251E+00,
A14 = 0.70244E−01, A16 = −0.15061E−01, A18 = 0.13546E−02

Various forms of data

| Focal distance | 2.91 mm |
| F-number | 2.88 |
| Image height | 1.75 mm |
| Overall lens length | 3.24 mm |
| BF | 0.09 mm |
| Focal distance of BK1 | 2.03 mm |
| Focal distance of BK2 | −3.18 mm |

FIGS. 13a, 13b and 13c show various forms of aberrations in the optical system of the example 2 where the lens layout and configuration are as described above. FIG. 13a indicates the spherical aberration (sine condition) (LONGITUDINAL SPHERICAL ABERRATION). FIG. 13b indicates the astigmatism (ASTIGMATISM FIELDCURVER). FIG. 13c indicates distortion (DISTORTION).

Example 3

Figure 14:
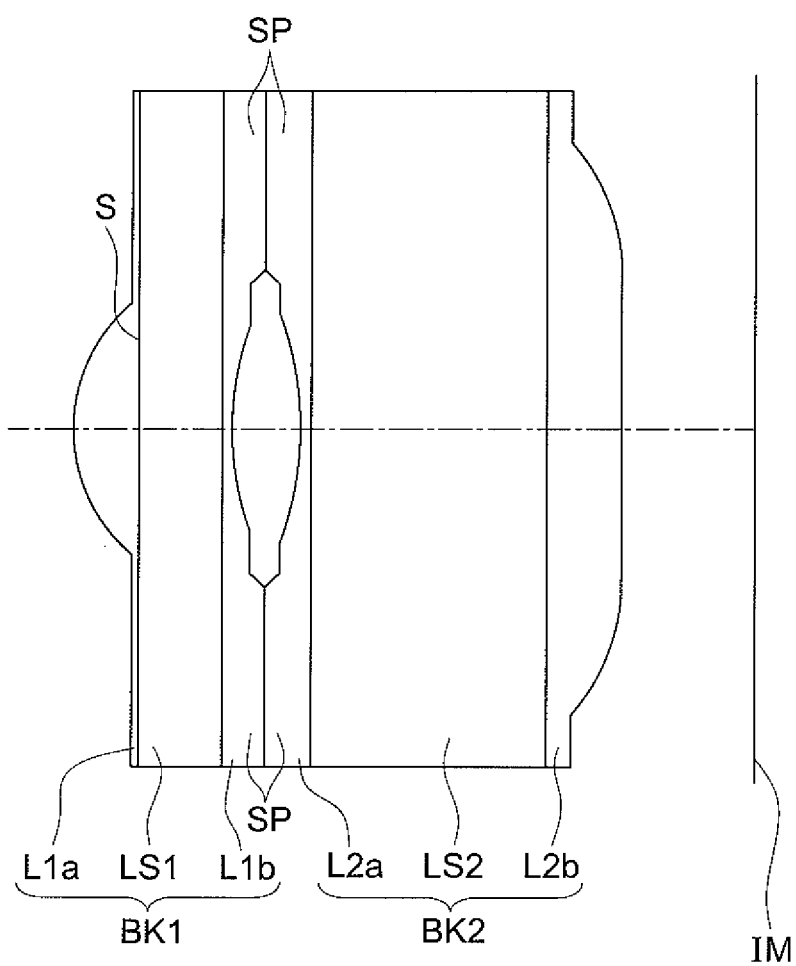
FIG. 14 is a cross sectional view representing an array of the lens group in the optical system of the example 3.
Figure 15C:
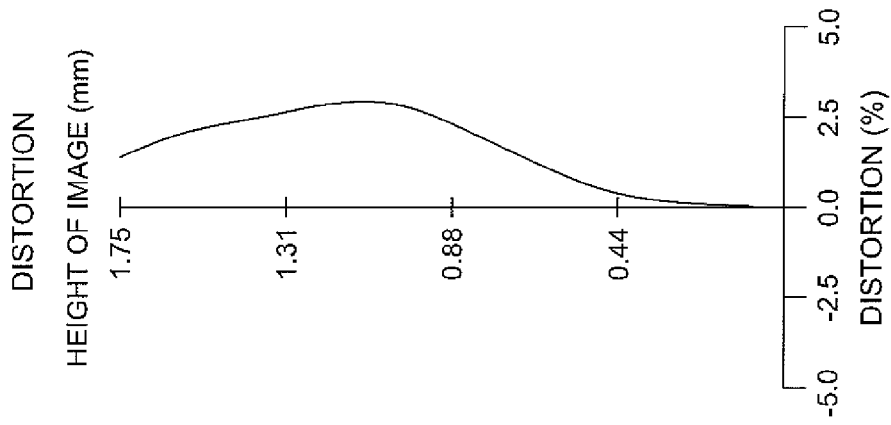
FIGS. 15a, 15b and 15c are aberration diagrams in the optical system of the example 3.
Figure 15B:
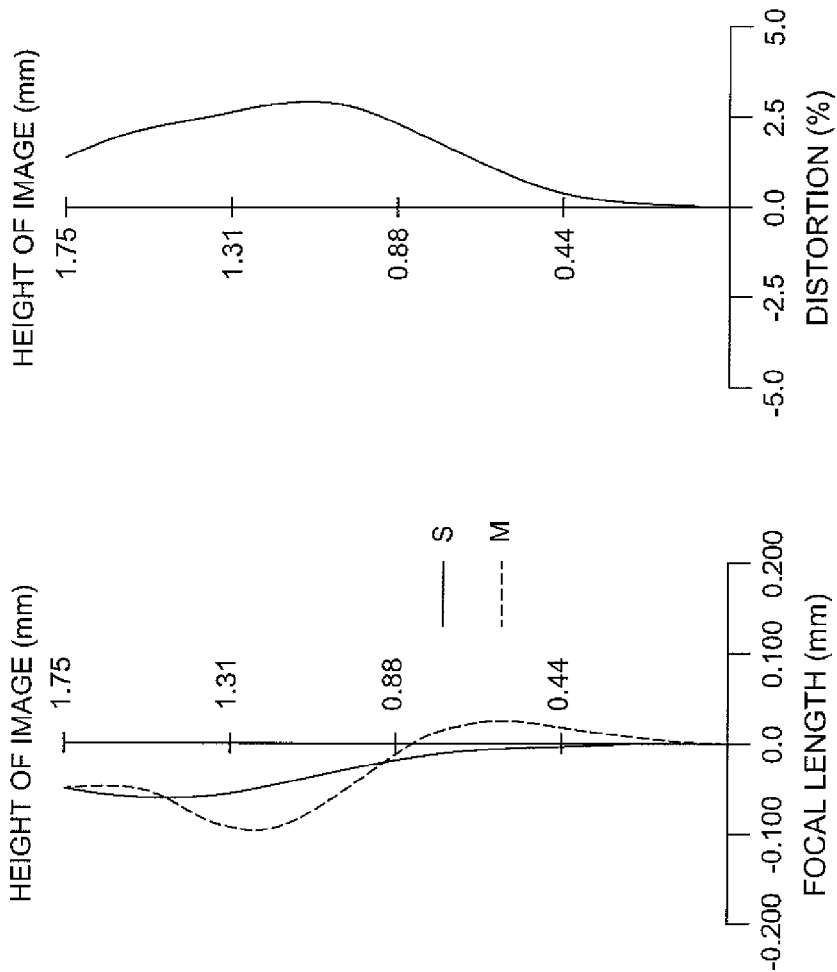
Figure 15A:
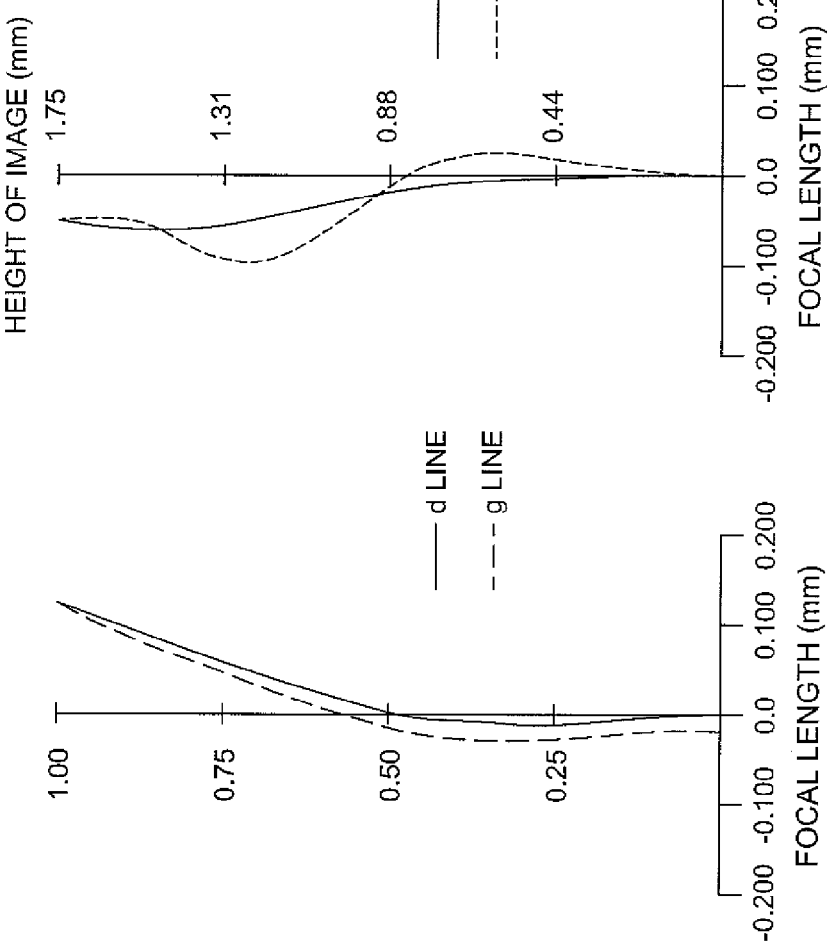

FIG. 14 is a cross sectional view representing an array of the lens group in the optical system of the example 3. FIGS. 15a, 15b and 15c are aberration diagrams in the optical system of the example 3. In example 3, space holding portions SP are formed on both of the first-b lens portion L1b of the first junction type compound lens BK1 and second-a lens portion L2a of the second junction type compound lens BK2, as shown in FIG. 4.

The optical system of the example 3 is composed of the first junction type compound lens BK1 and second junction type compound lens BK2 in that order from the object to the image side, as shown in FIG. 14. The first junction type compound lens BK1 includes a first-a lens portion L1a, aperture stop S, first lens substrate LS1 and first-b lens portion L1b, and has a positive refracting power. The second junction type compound lens BK2 contains a second-a lens portion L2a, second lens substrate LS2 and second-b lens portion L2b, and has a negative refracting power. The example 3 shows the case where the parallel flat plate PT is not provided, although this parallel flat plate PT is provided in other examples on the image side of the second junction type compound lens BK2. Thus, the image surface IM of the solid image pickup element is arranged on the image side of the second-b lens portion L2b of the second junction type compound lens BK2. All the surfaces of the lens portions in contact with air are aspherical.

In this structure, the light having entered from the object side passes through the first-a lens portion L1a, aperture stop S, first lens substrate LS1, first-b lens portion L1b, second-a lens portion L2a, second lens substrate LS2, and second-b lens portion L2b in that order along the optical axis. The optical image of an object is formed on the light-receiving surface IM of the image pickup element.

The following shows the construction data on each lens in the optical system of the example 3.

Numerical Example 3

Unit mm

Surface data

| Surface number | r | d | nd | vd | Effective radius |
|---|---|---|---|---|---|
| 1* | 0.827 | 0.32 | 1.513 | 55 | 0.55 |
| 2 (stop) | ∞ | 0.39 | 1.520 | 62 | 0.48 |
| 3 | ∞ | 0.05 | 1.640 | 23 | 0.49 |
| 4* | 2.186 | 0.32 | | | 0.48 |
| 5* | −4.099 | 0.05 | 1.572 | 35 | 0.57 |
| 6 | ∞ | 1.14 | 1.520 | 62 | 0.65 |
| 7 | ∞ | 0.35 | 1.610 | 29 | 1.33 |
| 8* | 25.188 | 0.65 | | | 1.41 |

Aspherical surface data

1st surface

K = 0.42426E−02, A4 = 0.29108E−01, A6 = −0.19265E+00,
A8 = 0.12593E+01, A10 = −0.34458E+01, A12 = 0.46137E+01

4th surface

K = 0.40282E+01, A4 = −0.38432E−01, A6 = 0.43119E+01,
A8 = −0.32281E+02, A10 = 0.13366E+03, A12 = −0.17412E+03

5th surface

K = 0.15371E+02, A4 = −0.60685E+00, A6 = 0.25322E+01,
A8 = −0.13154E+02, A10 = 0.26798E+02, A12 = −0.18687E+02

8th surface

K = 0.30000E+02, A4 = −0.10222E+00, A6 = 0.23279E+00,
A8 = −0.44391E+00, A10 = 0.42353E+00, A12 = −0.22098E+00,
A14 = 0.59866E−01, A16 = −0.66132E−02

Various forms of data

| Focal distance | 2.98 mm |
| F-number | 2.88 |
| Image height | 1.75 mm |
| Overall lens length | 3.27 mm |
| BF | 0.65 mm |
| Focal distance of BK1 | 2.39 mm |
| Focal distance of BK2 | −5.98 mm |

FIGS. 15a, 15b and 15c show various forms of aberrations in the optical system of the example 3 where the lens layout and configuration are as described above. FIG. 15a indicates the spherical aberration (sine condition) (LONGITUDINAL SPHERICAL ABERRATION). FIG. 15b indicates the astigmatism (ASTIGMATISM FIELDCURVER). FIG. 15c indicates distortion (DISTORTION).

Example 4

Figure 16:
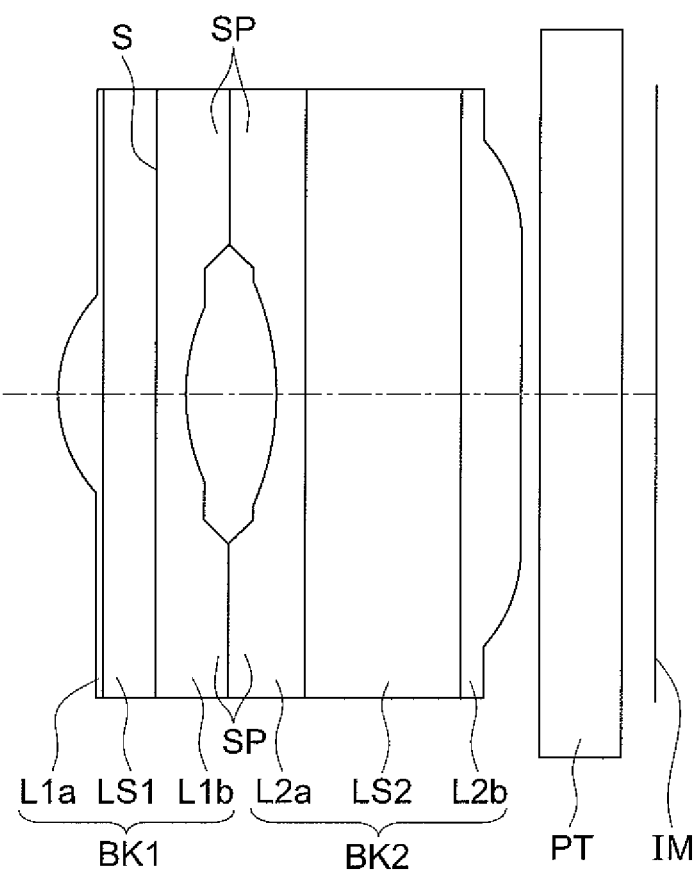
FIG. 16 is a cross sectional view representing an array of the lens group in the optical system of the example 4.

FIG. 16 is a cross sectional view representing an array of the lens group in the optical system of the example 4. FIGS. 17a, 17b and 17c are aberration diagrams in the optical system of the example 4. In the example 4, space holding portions SP are formed on both of the first-b lens portion L1b of the first junction type compound lens BK1 and second-a lens portion L2a of the second junction type compound lens BK2, as shown in FIG. 4.

The optical system of the example 4 is composed of the first junction type compound lens BK1 and second junction type compound lens BK2 in that order from the object to the image side, as shown in FIG. 16. The first junction type compound lens BK1 includes a first-a lens portion L1a, first lens substrate LS1, aperture stop S, and first-b lens portion L1b, and has a positive refracting power. The second junction type compound lens BK2 contains a second-a lens portion L2a, second lens substrate LS2 and second-b lens portion L2b, and has a negative refracting power. A parallel flat plate PT assumed to be an optical low-pass filter, an infrared cut filter or a seal glass of the solid image pickup element is provided on the image side of the second junction type compound lens BK2. Then an image surface IM of the solid image pickup element is arranged at the last position. All the surfaces of the lens portions in contact with air are aspherical.

In this structure, the light having entered from the object side passes through the first-a lens portion L1a, first lens substrate LS1, aperture stop S, first-b lens portion L1b, second-a lens portion L2a, second lens substrate LS2, second-b lens portion L2b, and parallel flat plate PT in that order along the optical axis. The optical image of an object is formed on the light-receiving surface IM of the image pickup element.

The following shows the construction data on each lens in the optical system of the example 4.

Numerical Example 4

Unit mm

Surface data

| Surface number | r | d | nd | vd | Effective radius |
|---|---|---|---|---|---|
| 1* | 0.845 | 0.25 | 1.513 | 55 | 0.55 |
| 2 | ∞ | 0.30 | 1.470 | 65 | 0.51 |
| 3 (stop) | ∞ | 0.17 | 1.610 | 29 | 0.50 |
| 4* | 2.231 | 0.49 | | | 0.50 |
| 5* | −4.276 | 0.17 | 1.572 | 35 | 0.63 |
| 6 | ∞ | 0.88 | 1.470 | 65 | 0.81 |
| 7 | ∞ | 0.33 | 1.700 | 36 | 1.39 |
| 8* | 8.194 | 0.10 | | | 1.46 |
| 9 | ∞ | 0.50 | 1.516 | 64 | 1.59 |
| 10 | ∞ | 0.16 | | | 1.70 |

Aspherical surface data

1st surface

K = −0.18642E−01, A4 = 0.42482E−01, A6 = −0.11195E+00,
A8 = 0.13865E+01, A10 = −0.52066E+01, A12 = 0.89294E+01

4th surface

K = 0.27654E+01, A4 = 0.31830E−01, A6 = 0.42787E+01,
A8 = −0.33891E+02, A10 = 0.14295E+03, A12 = −0.18868E+03

5th surface

K = −0.16316E+02, A4 = −0.58738E+00, A6 = 0.23546E+01,
A8 = −0.14449E+02, A10 = 0.34800E+02, A12 = −0.29702E+02

8th surface

K = 0.14622E+02, A4 = −0.10712E+00, A6 = 0.22395E+00,
A8 = −0.44303E+00, A10 = 0.42658E+00, A12 = −0.22276E+00,
A14 = 0.60414E−01, A16 = −0.66804E−02

Various forms of data

| Focal distance | 3.04 mm |
|---|---|
| F-number | 2.88 |

-continued

Unit mm

| Image height | 1.75 mm |
|---|---|
| Overall lens length | 3.35 mm |
| BF | 0.16 mm |
| Focal distance of BK1 | 2.42 mm |
| Focal distance of BK2 | −4.36 mm |

FIGS. 17a, 17b and 17c show various forms of aberrations in the optical system of the example 4 where the lens layout and configuration are as described above. FIG. 17a indicates the spherical aberration (sine condition) (LONGITUDINAL SPHERICAL ABERRATION). FIG. 17b indicates the astigmatism (ASTIGMATISM FIELDCURVER). FIG. 17c indicates distortion (DISTORTION).

Example 5

Figure 18:
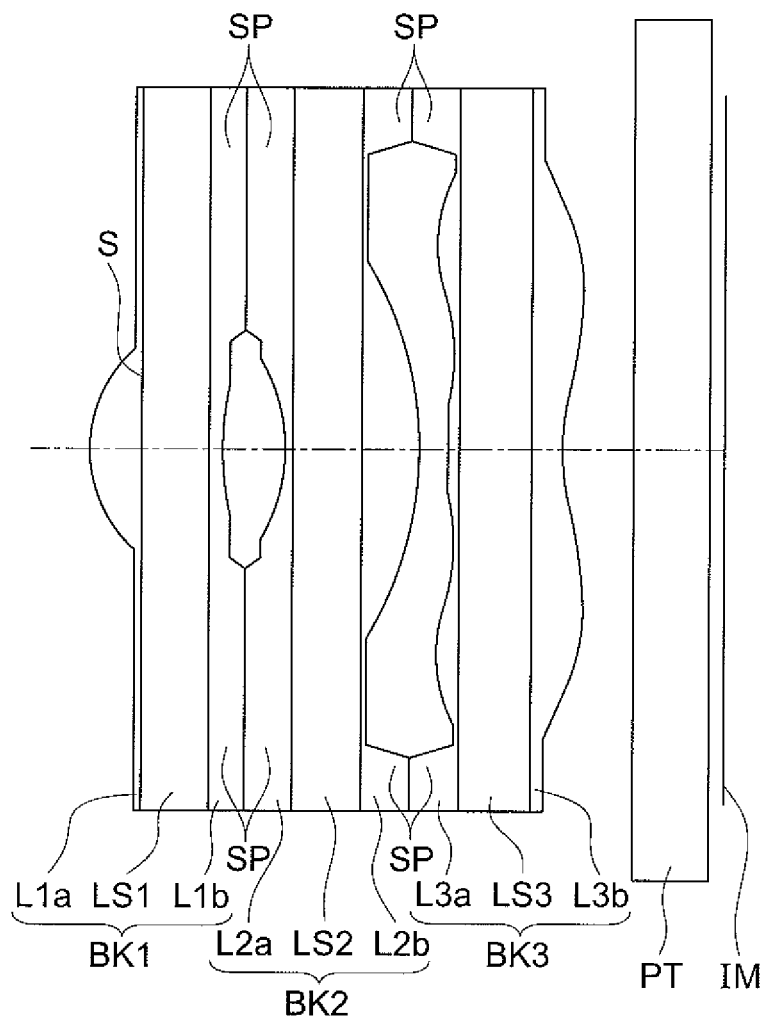
FIG. 18 is a cross sectional view representing an array of the lens group in the optical system of the example 5.
Figure 19:
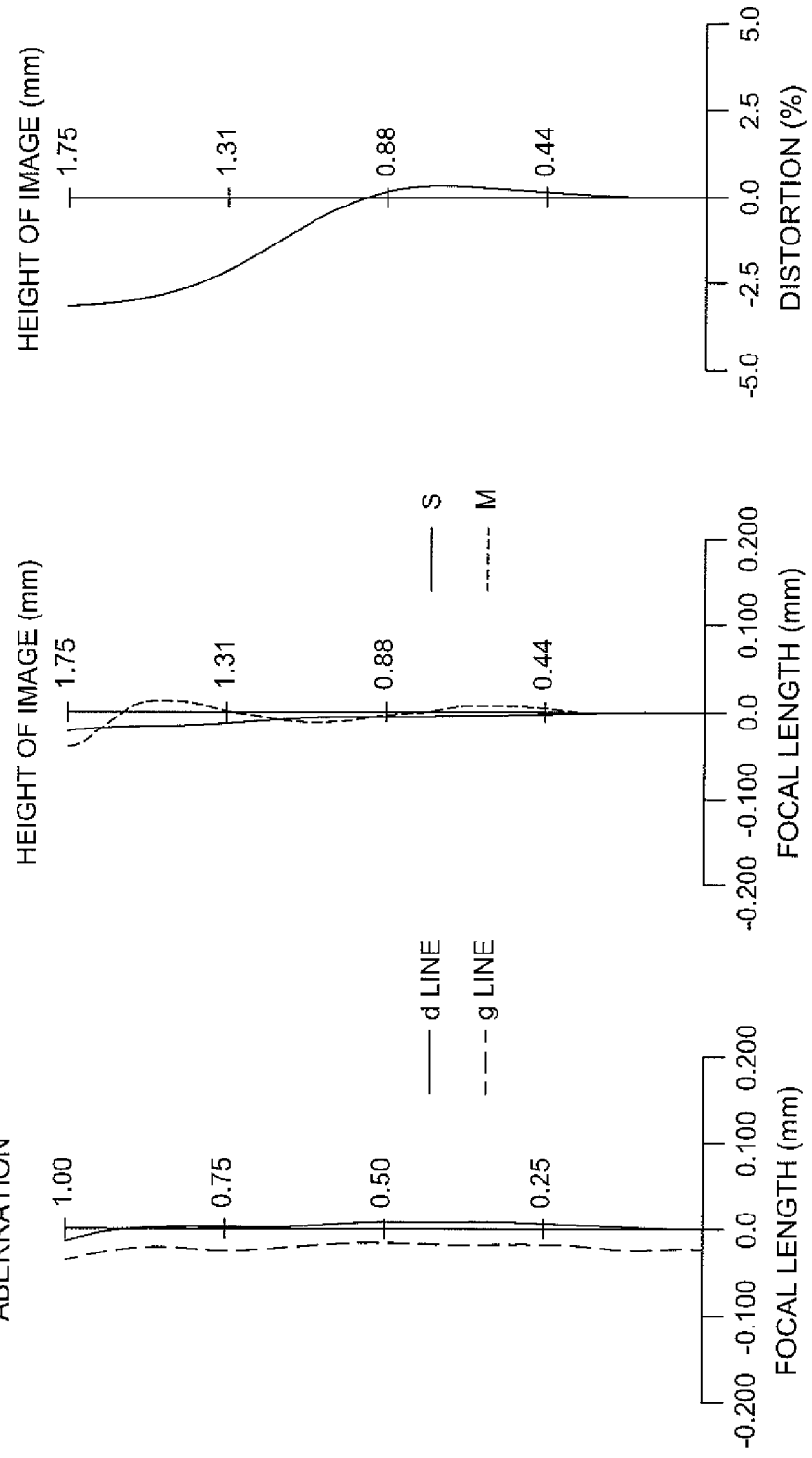
FIGS. 19a, 19b and 19c are aberration diagrams in the optical system of the example 5.

FIG. 18 is a cross sectional view representing an array of the lens group in the optical system of the example 5. FIGS. 19a, 19b and 19c are aberration diagrams in the optical system of the example 5. In the example 5, space holding portions SP are formed on both of the first-b lens portion L1b of the first junction type compound lens BK1 and second-a lens portion L2a of the second junction type compound lens BK2, and on both of the second-b lens portion L2b of the second junction type compound lens BK2 and the third-a lens portion L3a of the third junction type compound lens BK3, as shown in FIG. 4.

The optical system of the example is composed of the first junction type compound lens BK1, second junction type compound lens BK2, and the third junction type compound lens BK3 in that order from the object to the image side, as shown in FIG. 18. The first junction type compound lens BK1 includes a first-a lens portion L1a, aperture stop S, first lens substrate LS1, and first-b lens portion L1b, and has a positive refracting power. The second junction type compound lens BK2 contains a second-a lens portion L2a, second lens substrate LS2 and second-b lens portion L2b, and has a negative refracting power. The third junction type compound lens BK3 contains a third-a lens portion L3a, third lens substrate LS3 and third-b lens portion L3b, and has a negative refracting power. A parallel flat plate PT is provided on the image side of the third junction type compound lens BK BK3. Then an image surface IM of the solid image pickup element is arranged at the last position. All the surfaces of the lens portions in contact with air are aspherical.

In this structure, the light having entered from the object side passes through the first-a lens portion L1a, aperture stop S, first lens substrate LS1, first-b lens portion L1b, second-a lens portion L2a, second lens substrate LS2, second-b lens portion L2b, third-a lens portion L3a, third lens substrate LS3, third-b lens portion L3b, and parallel flat plate PT in that order along the optical axis. The optical image of an object is formed on the light-receiving surface IM of the image pickup element.

The following shows the construction data on each lens in the optical system of the example 5.

Numerical Example 5

Unit mm

Surface data

| Surface number | r | d | nd | vd | Effective radius |
|---|---|---|---|---|---|
| 1* | 0.807 | 0.25 | 1.520 | 57 | 0.51 |
| 2 (stop) | ∞ | 0.35 | 1.474 | 56 | 0.46 |
| 3 | ∞ | 0.05 | 1.550 | 32 | 0.38 |
| 4* | 2.163 | 0.29 | | | 0.40 |
| 5* | −1.866 | 0.05 | 1.550 | 32 | 0.47 |
| 6 | ∞ | 0.35 | 1.474 | 56 | 0.60 |
| 7 | ∞ | 0.25 | 1.520 | 57 | 0.89 |
| 8* | −4.203 | 0.16 | | | 0.92 |
| 9* | 2.063 | 0.07 | 1.520 | 57 | 1.28 |
| 10 | ∞ | 0.35 | 1.474 | 56 | 1.31 |
| 11 | ∞ | 0.16 | 1.550 | 32 | 1.45 |
| 12* | 1.527 | 0.35 | | | 1.48 |
| 13 | ∞ | 0.35 | 1.516 | 64 | 1.66 |
| 14 | ∞ | 0.08 | | | 1.76 |

Aspherical surface data

1st surface $K = 0.28508E+00, A4 = -0.87713E-01, A6 = 0.21298E+00,$
$A8 = -0.14396E+01, A10 = 0.14584E+01$ 4th surface $K = 0.97774E+01, A4 = 0.25489E-01, A6 = -0.61032E+00,$
$A8 = 0.30926E+01, A10 = -0.18322E+02$ 5th surface $K = 0.14234E+02, A4 = -0.70651E-01, A6 = -0.10788E+01,$
$A8 = 0.10856E+01, A10 = -0.54022E+01, A12 = 0.30721E+01$ 8th surface $K = 0.11337E+02, A4 = -0.26901E+00, A6 = 0.15260E+00,$
$A8 = 0.61211E-01, A10 = -0.31879E-01, A12 = -0.10580E-01$ 9th surface $K = -0.20317E+00, A4 = -0.62011E+00, A6 = 0.40387E+00,$
$A8 = -0.16614E-01, AI0 = -0.65032E-01, A12 = 0.17149E-01$ 12th surface $K = -0.69147E+01, A4 = -0.20810E+00, A6 = 0.82076E-01,$
$A8 = -0.36905E-01, A10 = 0.10277E-01, A12 = -0.36994E-03$ Various forms of data

| Focal distance | 2.75 mm |
|---|---|
| F-number | 2.88 |
| Image height | 1.75 mm |
| Overall lens length | 3.11 mm |
| BF | 0.65 mm |
| Focal distance of BK1 | 2.17 mm |
| Focal distance of BK2 | −6.45 mm |
| Focal distance of BK3 | −13.67 mm |

FIGS. 19a, 19b and 19c show various forms of aberrations in the optical system of the example 5 where the lens layout and configuration are as described above. FIG. 19a indicates the spherical aberration (sine condition) (LONGITUDINAL SPHERICAL ABERRATION). FIG. 19b indicates the astigmatism (ASTIGMATISM FIELDCURVER). FIG. 19c indicates distortion (DISTORTION).

Example 6

Figure 20:
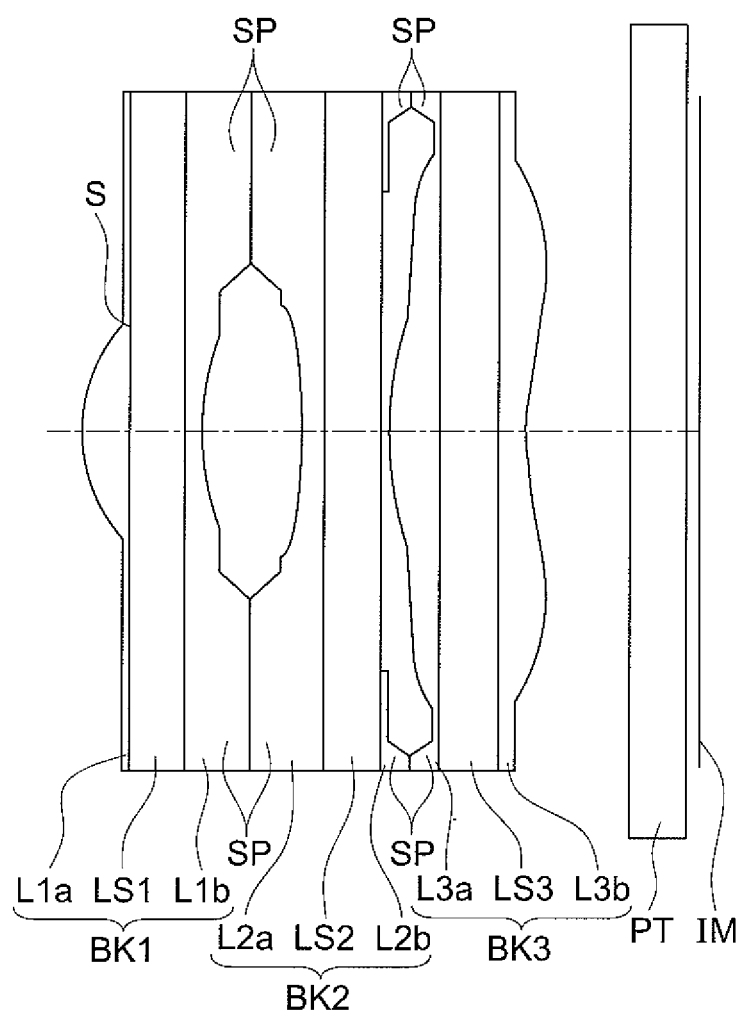
FIG. 20 is a cross sectional view representing an array of the lens group in the optical system of the example 6.

FIG. 20 is a cross sectional view representing an array of the lens group in the optical system of the example 6. FIGS. 21a, 21b and 21c are aberration diagrams in the optical system of the example 6. In the example 6, space holding portions SP are formed on both of the first-b lens portion L1b of the first junction type compound lens BK1 and second-a lens portion L2a of the second junction type compound lens BK2, and on both of the second-b lens portion L2b of the second junction type compound lens BK2 and the third-a lens portion L3a of the third junction type compound lens BK3, as shown in FIG. 4.

The optical system of the example 6 is composed of the first junction type compound lens BK1, second junction type compound lens BK2, and the third junction type compound lens BK3 in that order from the object to the image side, as shown in FIG. 20. The first junction type compound lens BK1 includes a first-a lens portion L1a, aperture stop S, first lens substrate LS1, and first-b lens portion L2b, and has a positive refracting power. The second junction type compound lens BK2 contains a second-a lens portion L2a, second lens substrate LS2, and has a negative refracting power. The third junction type compound lens BK3 contains a third-a lens portion Lia, third lens substrate LS3 and third-b lens portion L3b, and has a positive refracting power. A parallel flat plate PT is provided on the image side of the third junction type compound lens BK3. Then an image surface IM of the solid image pickup element is arranged at the last position. All the surfaces of the lens portions in contact with air are aspherical. The second-b lens portion L2b of the second junction type compound lens BK2 is provided only on the portion where the space holding portion SP is formed, and also serves as the warpage preventive function shown in FIGS. 9A, 9B and 9C.

In this structure, the light having entered from the object side passes through the first-a lens portion L1a, aperture stop S, first lens substrate LS1, first-b lens portion L1b, second-a lens portion L2a, second lens substrate LS2, third-a lens portion L3a, third lens substrate LS3, third-b lens portion L3b, and parallel flat plate PT in that order along the optical axis. The optical image of an object is formed on the light-receiving surface IM of the image pickup element.

The following shows the construction data on each lens in the optical system of the example 6.

Numerical Example 6

Unit mm

Surface data

| Surface number | r | d | nd | vd | Effective radius |
|---|---|---|---|---|---|
| 1* | 0.904 | 0.21 | 1.520 | 57 | 0.51 |
| 2 (stop) | ∞ | 0.30 | 1.474 | 56 | 0.47 |
| 3 | ∞ | 0.09 | 1.520 | 57 | 0.50 |
| 4* | 1.999 | 0.51 | | | 0.51 |
| 5* | −2.602 | 0.11 | 1.520 | 57 | 0.67 |
| 6 | ∞ | 0.30 | 1.474 | 56 | 0.79 |
| 7 | ∞ | 0.05 | | | 0.96 |
| 8* | 1.330 | 0.25 | 1.5200 | 57 | 1.16 |
| 9 | ∞ | 0.30 | 1.4740 | 56 | 1.21 |
| 10 | ∞ | 0.14 | 1.5200 | 57 | 1.36 |
| 11* | 1.554 | 0.53 | | | 1.40 |
| 12 | ∞ | 0.30 | 1.5163 | 64 | 1.63 |
| 13 | ∞ | 0.07 | | | 1.71 |

-continued

Unit mm

Aspherical surface data

1st surface

K = −0.29885E−01, A4 = −0.19971E−01, A6 = 0.52503E+00,
A8 = −0.17949E+01, A10 = 0.28867E+01
4th surface K = 0.10267E+00, A4 = 0.24735E+00, A6 = 0.49138E+00,
A8 = −0.20173E+01, A10 = 0.82380E+01
5th surface K = 0.72611E+01, A4 = 0.33086E+00, A6 = −0.21271E+00,
A8 = −0.37893E+01, A10 = 0.97338E+01, A12 = −0.91112E+01
8th surface K = −0.62417E+01, A4 = −0.31452E+00, A6 = 0.18880E+00,
A8 = 0.29815E−01, A10 = −0.59214E−01, A12 = 0.15006E−01
11th surface K = −0.56553E+01, A4 = −0.15975E+00, A6 = 0.30953E−01,
A8 = −0.15564E−01, A10 = 0.59725E−02, A12 = −0.29519E−03

Various forms of data

| | |
|---|---|
| Focal distance | 2.79 mm |
| F-number | 2.88 |
| Image height | 1.75 mm |
| Overall lens length | 3.16 mm |
| BF | 0.80 mm |
| Focal distance of BK1 | 2.66 mm |
| Focal distance of BK2 | −5.01 mm |
| Focal distance of BK3 | 8.56 mm |

FIGS. 21a, 21b and 21c show various forms of aberrations in the optical system of the example 6 where the lens layout and configuration are as described above. FIG. 21a indicates the spherical aberration (sine condition) (LONGITUDINAL SPHERICAL ABERRATION). FIG. 21b indicates the astigmatism (ASTIGMATISM FIELDCURVER). FIG. 21c indicates distortion (DISTORTION).

As described above, according to the present invention, the space between the junction type compound lenses facing each other or the space between the junction type compound lens and other optical element is held by the space holding portion formed outside the effective aperture of one or both of the junction type compound lenses facing each other. Easy formation, without the thickness of the space holding portion being much increased over the thickness at the effective aperture portion of the lens, is ensured by direct contact between the mating face provided on the surface of the space holding portion and the mating face provided opposite the mating face of the space holding portion, outside the effective aperture of the other opposite junction type compound lens, or by direct contact between the mating faces on the mutually opposing surfaces of the space holding portions formed on both junction type compound lenses facing each other. This structure ensures easy production.

Since the space holding portion is made of the same material as that of the lens portion, the range of selecting the cutting conditions is expanded, and the distortion in the shape of the lens caused by the cutting force is reduced, with the result that performances of the imaging lens are enhanced. This arrangement provides an imaging lens and imaging unit characterized by easier production and higher performances.

The detailed configuration and operations of the components constituting the imaging lens, manufacturing method and imaging unit thereof can be embodied with appropriate modification, without departing from the technological spirit and scope of the present invention.

DESCRIPTION OF REFERENCE SYMBOLS

LN Imaging lens
C1, BK1 First junction type compound lens
L1P, LS1 Lens substrate (of the fast junction type compound lens)
L1A, L1B, L1a, L1b Lens portion (of the first junction type compound lens)
C2, BK2 Second junction type compound lens
L2P, LS2 Lens substrate (of the second junction type compound lens)
L2A, L2B, L2a, L2b Lens portion (of the second junction type compound lens)
C3, BK3 Third junction type compound lens
LS3 Lens substrate (of the third junction type compound lens)
L3a, L3b Lens portion (of the third junction type compound lens)
S Aperture stop
SP Space holding portion
S1, S2 Mating face
RN Bonding layer
TN Linear recess
SD Opaque sheet
SA Mating face
LA Lens portion
LB Resin layer
LP Lens substrate

What is claimed is:

1. An imaging lens comprising at least one set of junction type compound lenses facing each other, each of the junction type compound lenses including a parallel tabular lens substrate and a lens portion formed on at least one of substrate surfaces of the lens substrate,
wherein a space holding portion made of a same material as a material of the lens portion is formed on one of the junction type compound lenses facing each other, outside an effective aperture of the one of the junction type compound lenses, and
wherein a mating face provided on a surface of the space holding portion is placed in direct contact with a mating face provided on another facing junction type compound lens among the junction type compound lenses at a position facing the mating face of the space holding portion, outside an effective aperture of the another facing junction type compound lens.

2. An imaging lens comprising at least one set of junction type compound lenses facing each other, each of the junction type compound lenses including a parallel tabular lens substrate and a lens portion formed on at least one of substrate surfaces of the lens substrate,
wherein a space holding portion made of a same material as a material of the lens portion is formed on each of the junction type compound lenses facing each other, outside effective apertures of the junction type compound lenses, and
wherein mating faces, each of which is provided on an opposing surface of the space holding portion of each of the junction type compound lenses are placed in direct contact with each other.

3. The imaging lens of claim 1,
wherein the junction type compound lenses facing each other comprises a first junction type compound lens located closest to an object, and a second junction type compound lens arranged on an image side of the first junction type compound lens so as to face the first junction type compound lens, and the first junction type compound lens comprises, in order of alignment from the object, a first-a lens portion with a convex surface facing the object, a first lens substrate, and a first-b lens portion with a concave surface facing an image, and the second junction type compound lens comprises, in order of alignment from the object, a second-a lens portion with a concave surface facing the object and a second lens substrate.

4. The imaging lens of claim 1, further comprising:
an opaque lightproof sheet between the junction type compound lenses facing each other, outside effective apertures of the junction type compound lenses.

5. The imaging lens of claim 1,
wherein a linear recessed portion is formed on a part of the space holding portion.

6. The imaging lens of claim 1, further comprising:
a warpage preventive function on a substrate surface of the lens substrate, opposite to a substrate surface on which the space holding portion is formed.

7. The imaging lens of claim 6,
wherein the warpage preventive function is made of a resin layer.

8. The imaging lens of claim 6,
wherein the warpage preventive function is made of a thin film.

9. The imaging lens of claim 1,
wherein the space holding portion is formed around the lens portion of a junction type compound lens which has a larger effective aperture among the junction type compound lenses facing each other, by increasing a thickness of a resin layer made of a same material as a material of the lens portion.

10. The imaging lens of claim 1, satisfying $$tl/tb<3.0$$

wherein "tl" indicates a thickness from the mating face of the space holding portion to the lens substrate, and "tb" indicates a thickness of the lens substrate.

11. The imaging lens of claim 1, which comprises a junction type compound lens located closest to the object and satisfies $$0.5<f1/f<1.3$$

wherein "f1" indicates a focal distance of the junction type compound lens closest to the object, and "f" indicates a composite focal distance of an entire imaging lens system.

12. The imaging lens of claim 3 consisting of only the first junction type compound lens and the second junction type compound lens and satisfying $$0.65<f1/f<0.90$$

wherein "f1" indicates a focal distance of a junction type compound lens closest to the object, and "f" indicates a composite focal distance of an entire imaging lens system.

13. The imaging lens of claim 12, satisfying $$0.10<d/f<0.35$$

wherein "d" indicates a distance between lens substrates of two junction type compound lenses which have been united, and "f" indicates a composite focal distance of an entire imaging lens system.

14. An imaging unit comprising the imaging lens of claim 1 and an image pickup element.

15. A method of manufacturing an imaging lens comprising at least one set of junction type compound lenses facing each other, each of the junction type compound lenses including a parallel tabular lens substrate and a lens portion formed on at least one of substrate surfaces of the lens substrate, the method comprising the steps of:
forming a space holding portion made of a same material as a material of the lens portion on one of junction type compound lenses facing each other, outside an effective aperture of the one of the junction type compound lenses; and
bonding to fix the junction type compound lenses facing each other together during assembling, while placing a mating face provided on a surface of the space holding portion in direct contact with a mating face provided on another facing junction type compound lens among the junction type compound lenses at a position facing the mating face of the space holding portion, outside an effective aperture of the another facing junction type compound lens.

16. A method of manufacturing an imaging lens comprising at least one set of junction type compound lenses facing each other, each of the junction type compound lenses including a parallel tabular lens substrate and a lens portion formed on at least one of substrate surfaces of the lens substrate, the method comprising the steps of:
forming a space holding portion made of a same material as a material of the lens portion on each of the junction type compound lenses facing each other, outside effective apertures of both of the junction type compound lenses; and
bonding to fix the junction type compound lenses facing each other together during assembling, while placing mating faces, each of which is provided on an opposing surface of the space holding portion of each of the junction type compound lenses in direct contact with each other.

17. The imaging lens of claim 2,
wherein the junction type compound lenses facing each other comprises a first junction type compound lens located closest to an object, and a second junction type compound lens arranged on an image side of the first junction type compound lens so as to face the first junction type compound lens, and the first junction type compound lens comprises, in order of alignment from the object, a first-a lens portion with a convex surface facing the object, a first lens substrate, and a first-b lens portion with a concave surface facing an image, and the second junction type compound lens comprises, in order of alignment from the object, a second-a lens portion with a concave surface facing the object and a second lens substrate.

18. The imaging lens of claim 2, further comprising:
an opaque lightproof sheet between the junction type compound lenses facing each other, outside effective apertures of the junction type compound lenses.

19. The imaging lens of claim 2,
wherein a linear recessed portion is formed on a part of the space holding portion.

20. The imaging lens of claim 2, further comprising:
a warpage preventive function on a substrate surface of the lens substrate, opposite to a substrate surface on which the space holding portion is formed.

21. The imaging lens of claim 20,
wherein the warpage preventive function is made of a resin layer.

22. The imaging lens of claim 20,
wherein the warpage preventive function is made of a thin film.

23. The imaging lens of claim 2,
wherein the space holding portion is formed around the lens portion of a junction type compound lens which has a larger effective aperture among the junction type compound lenses facing each other, by increasing a thickness of a resin layer made of a same material as a material of the lens portion.

24. The imaging lens of claim 2, satisfying $$tl/tb<3.0$$

wherein "tl" indicates a thickness from the mating face of the space holding portion to the lens substrate, and "tb" indicates a thickness of the lens substrate.

25. The imaging lens of claim 2, which comprises a junction type compound lens located closest to the object and satisfies $$0.5<f1/f<1.3$$

wherein "f1" indicates a focal distance of the junction type compound lens closest to the object, and "f" indicates a composite focal distance of an entire imaging lens system.

26. The imaging lens of claim 17 consisting of only the first junction type compound lens and the second junction type compound lens and satisfying $$0.65<f1/f<0.90$$

wherein "f1" indicates a focal distance of a junction type compound lens closest to the object, and "f" indicates a composite focal distance of an entire imaging lens system.

27. The imaging lens of claim 26, satisfying $$0.10<d/f<0.35$$

wherein "d" indicates a distance between lens substrates of two junction type compound lenses which have been united, and "f" indicates a composite focal distance of an entire imaging lens system.

28. An imaging unit comprising the imaging lens of claim 2 and an image pickup element.

29. The imaging lens of claim 1,
wherein the junction type compound lenses facing each other comprises a first junction type compound lens located closest to an object, and a second junction type compound lens arranged on an image side of the first junction type compound lens, so as to face the first junction type compound lens, and the first junction type compound lens comprises, in order of alignment from the object, a first lens substrate and a first-b lens portion with a convex surface facing an image, and the second junction type compound lens comprises, in order of alignment from the object, a second-a lens portion with a convex surface facing the object and a second lens substrate.

30. The imaging lens of claim 2,
wherein the junction type compound lenses facing each other comprises a first junction type compound lens located closest to an object, and a second junction type compound lens arranged on an image side of the first junction type compound lens so as to face the first junction type compound lens, and the first junction type compound lens comprises, in order of alignment from the object, a first lens substrate and a first-b lens portion with a convex surface facing an image, and the second junction type compound lens comprises, in order of alignment from the object, a second a-lens portion with a convex surface facing the object and a second lens substrate.

31. The method of manufacturing an imaging lens of claim 15,
wherein the junction type compound lenses facing each other comprises a first junction type compound lens located closest to an object, and a second junction type compound lens arranged on an image side of the first junction type compound lens so as to face the first junction type compound lens, and the first junction type compound lens comprises, in order of alignment from the object, a first lens substrate and a first-b lens portion with a convex surface facing an image, and the second junction type compound lens comprises, in order of alignment from the object, a second a-lens portion with a convex surface facing the object and a second lens substrate.

32. The method of manufacturing an imaging lens of claim 16,
wherein the junction type compound lenses facing each other comprises a first junction type compound lens located closest to an object, and a second junction type compound lens arranged on an image side of the first junction type compound lens so as to face the first junction type compound lens, and the first junction type compound lens comprises, in order of alignment from the object, a first lens substrate and a first-b lens portion with a convex surface facing an image, and the second junction type compound lens comprises, in order of alignment from the object, a second a-lens portion with a convex surface facing the object and a second lens substrate.

* * * * *